United States Patent [19]
Risk et al.

[11] Patent Number: 4,872,738
[45] Date of Patent: Oct. 10, 1989

[54] ACOUSTO-OPTIC FIBER-OPTIC FREQUENCY SHIFTER USING PERIODIC CONTACT WITH A SURFACE ACOUSTIC WAVE

[75] Inventors: William P. Risk, Palo Alto; Gordon S. Kino, Stanford, both of Calif.

[73] Assignee: The Board of Trustees of the Leland Stanford Junior University, Stanford, Calif.

[21] Appl. No.: 830,461

[22] Filed: Feb. 18, 1986

[51] Int. Cl.[4] .............................................. G02F 2/02
[52] U.S. Cl. ............................. 350/96.29; 350/96.15; 350/358; 350/371
[58] Field of Search ............... 350/96.13, 96.15, 96.29, 350/96.30, 353, 355, 356, 358, 370, 371

[56] References Cited

U.S. PATENT DOCUMENTS

| | | | |
|---|---|---|---|
| 3,406,358 | 10/1968 | Seidel et al. | 333/150 |
| 3,625,589 | 12/1971 | Snitzer | 350/96.29 |
| 3,645,603 | 2/1972 | Smith | 350/371 |
| 3,931,518 | 1/1976 | Miller | 250/227 |
| 4,067,643 | 1/1978 | Sugimura et al. | 350/96.15 |
| 4,086,484 | 4/1978 | Steensma | 350/96.10 X |
| 4,236,786 | 12/1980 | Keck | 350/96.15 |
| 4,312,562 | 1/1982 | Segawa et al. | 350/96.15 |
| 4,319,186 | 3/1982 | Kingsley | 324/96 |
| 4,588,296 | 5/1986 | Cahill et al. | 350/358 X |
| 4,649,529 | 3/1987 | Avicola | 350/96.15 X |
| 4,666,255 | 5/1987 | Taylor et al. | 350/371 |
| 4,684,215 | 8/1987 | Shaw et al. | 350/96.29 |
| 4,735,484 | 4/1988 | Fesler | 350/96.29 |
| 4,735,485 | 4/1988 | Shaw et al. | 350/96.29 |
| 4,792,207 | 12/1988 | Shaw et al. | 350/96.29 |
| 4,793,676 | 12/1988 | Risk | 350/96.13 |

FOREIGN PATENT DOCUMENTS 57-158616 9/1982 Japan.

OTHER PUBLICATIONS

E. G. Cook et al., "Surface Waves at Ultrasonic Frequencies;" ASTM Bulletin (TP 127), May 1954, pp. 81–84.
C. Lardat et al., "Applications of Edge-bonded Transducers to SAW Components", Proceedings of the IEEE, vol. 64, No. 5, May 1976, pp. 627–630.
F. Gfeller, "Electroacoustic Transducers for Optical Fiber Modulator and Tap," IBM Technical Disclosure Bulletin, vol. 21, No. 2, Jul. 1978, pp. 813–814.
F. Gfeller et al., "Modulator and Tap for Optical Fiber Systems," IBM Technical Disclosure Bulletin, vol. 21, No. 5, Oct. 1978, pp. 2014–2015.
M. R. Layton et al., "Optical fiber acoustic sensor utilizing mode–mode interference," Applied Optics, vol. 18, No. 5, Mar. 1, 1979, pp. 666–670.
R. Ulrich et al., "Single-mode fiber-optical polarization rotator," Applied Optics, vol. 18, No. 11, Jun. 1, 1979, pp. 1857–1861.

(List continued on next page.)

Primary Examiner—John D. Lee
Attorney, Agent, or Firm—Knobbe, Martens, Olson & Bear

[57] ABSTRACT

An acoustic wave is propagated colinearly with the optical signals in an optical fiber to cause coupling of an optical signal in one propagation mode of the optical fiber to the other propagation mode in the optical fiber. The acoustic wave is selected to have an acoustic wave length which is shorter in the direction of optical propagation than the optical beat length between the two propagation modes of the fiber. In order to cause phase-matching between the two optical propagation modes, a periodic structure is used to cause the acoustic wave to contact the optical fiber at periodic locations so that the coupling between the two propagation modes is periodically enabled and disabled. The periodic contact of the acoustic wave with the optical fiber has the effect of adding a spatial propagation constant. The periodicity of the periodic structure is selected so that the spatial propagation constant of the periodic structure is equal to the mismatch in the propagation constants of the two optical propagation modes and the acoustic wave. The present invention thereby provides a means of obtaining greater shifts in the optical frequency while using a colinearly propagating acoustic wave.

32 Claims, 8 Drawing Sheets

OTHER PUBLICATIONS

Fred Heisman et al., "Integrated-Optical Single-Sideband Modulator and Phase Shifter," IEEE Journal of Quantum Electronics, vol. QE-18, No. 4, Apr. 1982, pp. 767-771.

Ken-ichi Kitayama et al., "Stress-induced frequency tuning for stimulated four-photon mixing in a birefringent single-mode fiber," Applied Physics Letters, vol. 41, No. 4, Aug. 1982, pp. 322-324.

K. K. Wong et al., "Electro-optic-waveguide frequency translator in LiNbO$_3$ fabricated by proton exchange," Optics Letters, vol. 7, No. 11, Nov. 1982, pp. 546-548 (1982).

R. H. Kingston et al., "Broadband guided-wave optical frequency translator using an electro-optical Bragg array," Applied Physics Letters, vol. 42, No. 9, May 1, 1983, pp. 759-761.

"K. Nosu et al., Acousto-Optic Frequency Shifter for Single Mode Fibers," published at the 47th International Conference on Integrated Optics and Optical Fiber Communications in Tokyo, Jun. 27-30, 1983, Paper 29C5-3, 4 pages.

K. Nosu et al., "Acoustooptic Phase Modulator for Single Mode Fibers," published at the 47th International Conference on Integrated Optics and Optical Fiber Communications in Tokyo, Jun. 27-30, 1983, Paper 28C3-5, 4 pages.

K. Nosu et al., "Acousto-Optic Frequency Shifter for Single Mode Fibers," Electronics Letters, vol. 19, No. 20, Sep. 29, 1983, pp. 816-818.

R. C. Youngquist et al., "Birefringent-Fiber Polarization Coupler," Optics Letters, vol. 8, No. 12, Dec. 1983, pp. 656-658.

W. P. Risk et al., "Single-sideband frequency shifting in birefringent optical fiber," SPIE vol. 478-Fiber Optic and Laser Sensors II, (1984), pp. 91-97.

W. P. Risk et al., "Acousto-Optic Birefringent Fiber Frequency Shifters," 5 pages, Integrated and Guided Wave Optics Conference, Kissimmee, Fla. (Apr. 24-26, 1984).

R. C. Youngquist et al., "Two-Mode Fiber Modal Coupler," Optics Letters, vol. 9, No. 5, May 1984, pp. 177-179.

J. L. Brooks et al., "Active Polarization coupler for Birefringent Fiber," Optics Letters, vol. 9, No. 6, Jun. 1984, pp. 249-251.

R. C. Youngquist, "Single-Sideband Frequency Shifting," Ph.d. Thesis: Loss and Periodic Coupling Effects in Dielectric Directional Couplers, Chap. 7, Department of Applied Physics, Stanford University, Jun. 1984, pp. 79-88.

W. P. Risk et al., "Acousto-optic frequency shifting in birefringent fiber," Optics Letters, vol. 9, No. 7, Jul. 1984 pp. 309-311.

F. Heismann et al., "Integrated-optical frequency translator with stripe waveguide," Applied Physics Letters, vol. 45, No. 5, Sep. 1, 1984, pp. 490-492.

W. P. Risk et al., "Acoustic Fiber-Optic Modulators," Proceedings of the IEEE Ultrasonics Symposium, Nov. 14-16, 1984, pp. 318-327.

L. M. Johnson, "Integrated-optical components for fiber gyroscopes," SPIE's 29th Annual International Technical Symposium on Optical and Electro-optical Engineering, paper 566-14, San Diego (Aug. 1985), published in SPIE Proc. vol. 566, pp. 96-98.

R. C. Youngquist et al., "All-fibre components using periodic coupling," IEEE Proceedings, vol. 132, Pt. J., No. 5, Oct. 1985, pp. 277-286.

Risk et al., "Acousto-optic polarization coupler and intensity modulator for birefringent fiber", Optics Letters, vol. 11, No. 1, Jan. 1986, pp. 48-50.

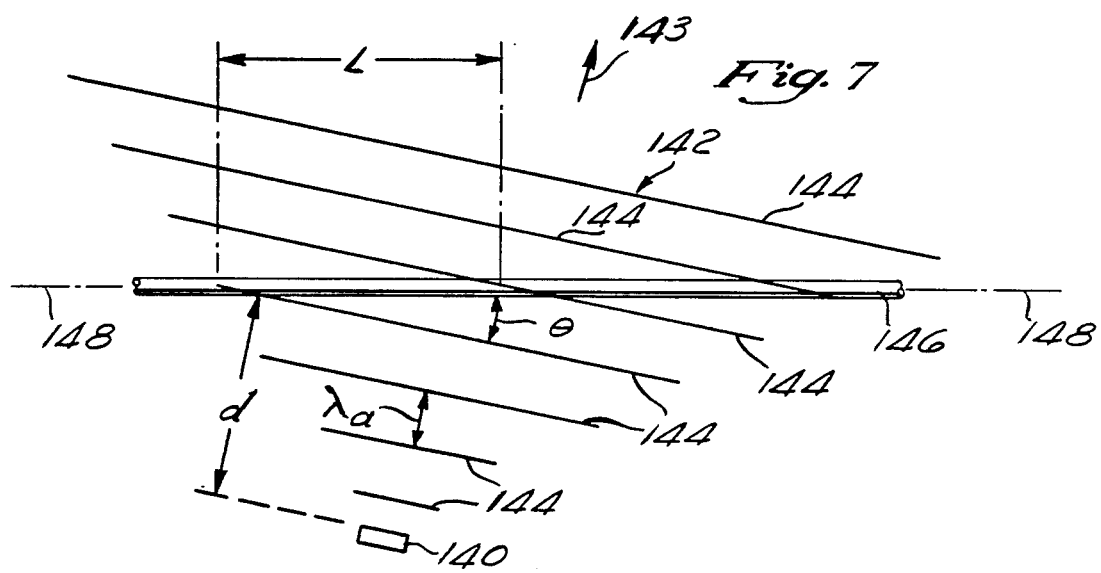
Fig. 7
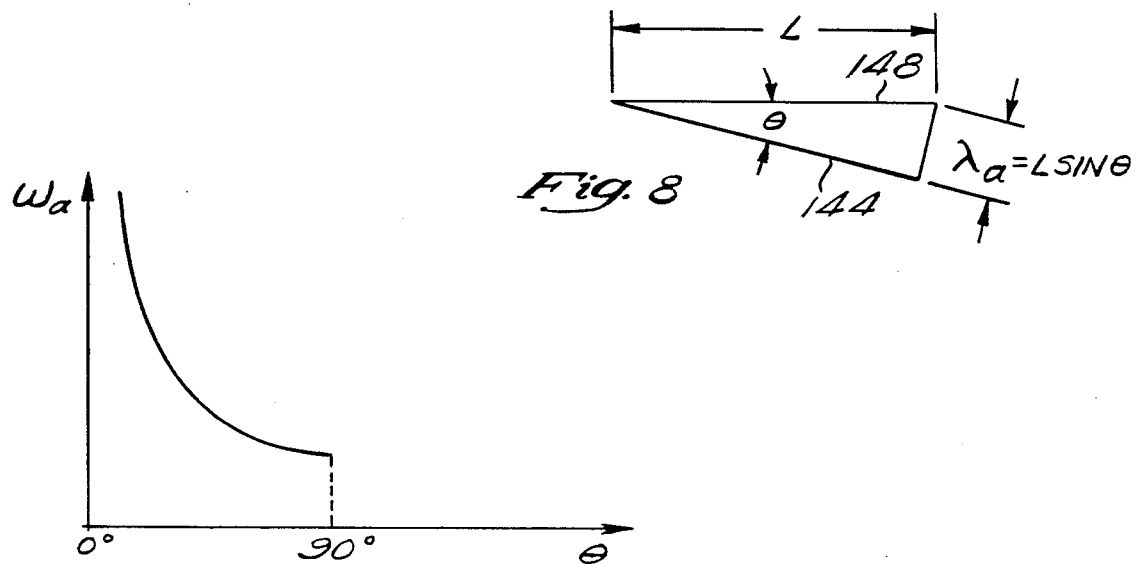
Fig. 8
Fig. 9

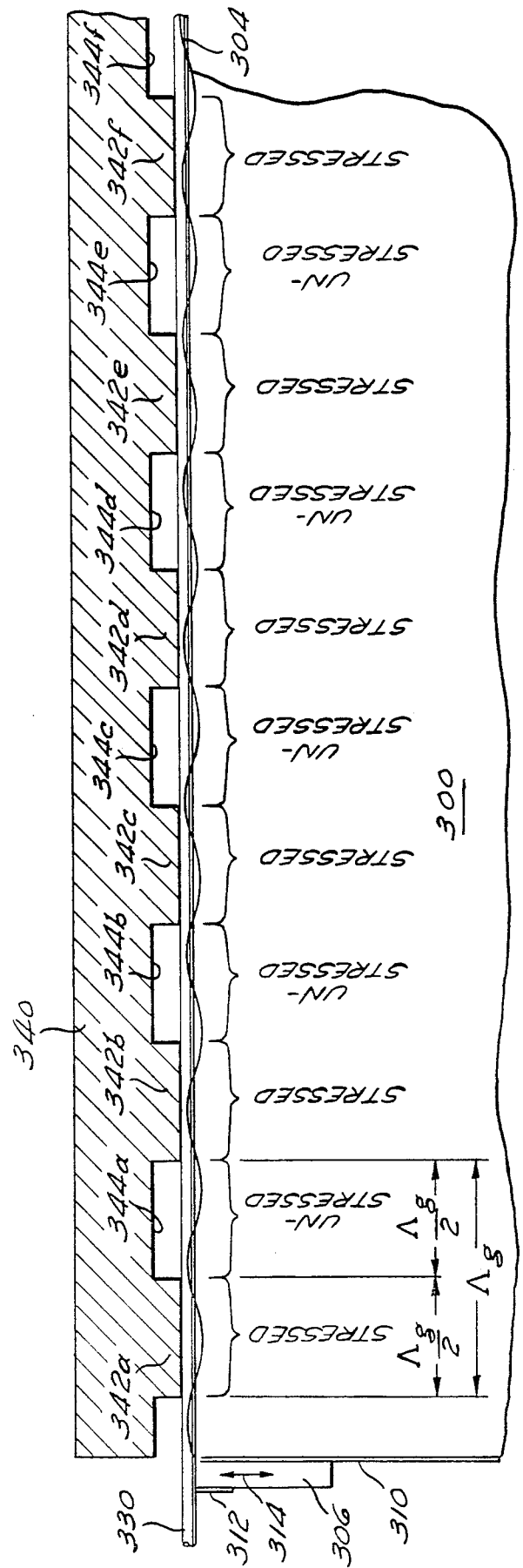

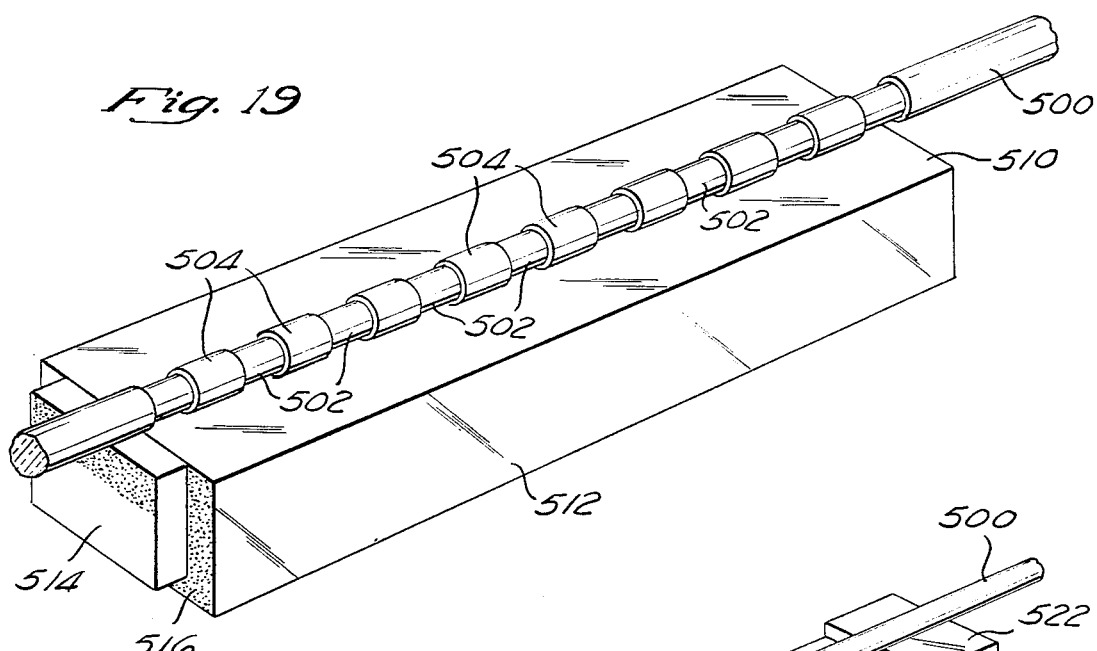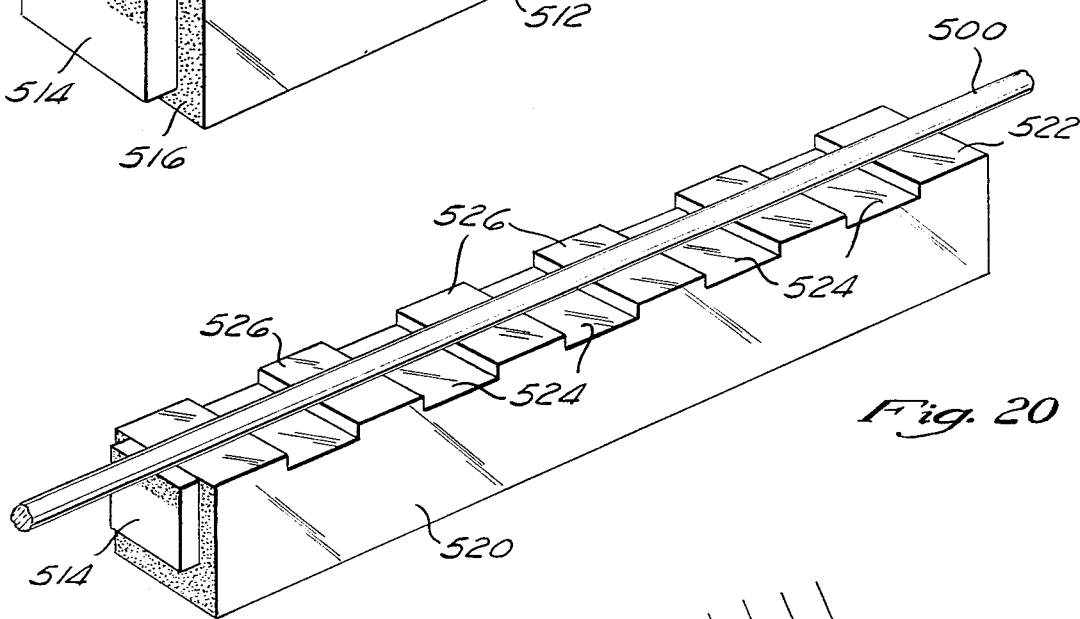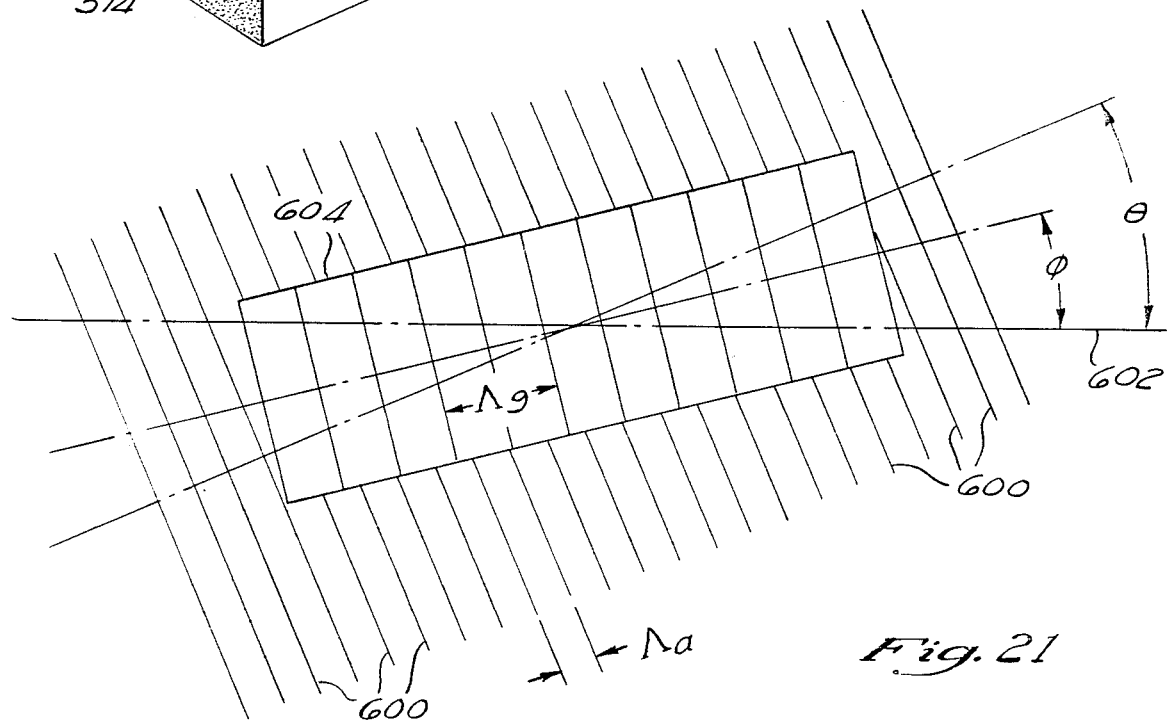

ACOUSTO-OPTIC FIBER-OPTIC FREQUENCY SHIFTER USING PERIODIC CONTACT WITH A SURFACE ACOUSTIC WAVE

FIELD OF THE INVENTION

The present invention relates to acousto-optic frequency shifters, and particularly to fiber-optic frequency shifters utilizing surface acoustic waves to cause an optical signal to be coupled from one propagation mode to another propagation mode.

BACKGROUND OF THE INVENTION

An optical fiber typically can support two or more propagation modes for an optical signal. For example, the light energy comprising the optical signal can travel in either the $LP_{01}$ or the $LP_{11}$ spatial propagation mode of a two-mode optical fiber. As another example, the light energy of an optical signal can travel in either of two orthogonal polarization modes in a birefringent single-mode optical fiber. In either of the two examples presented, the optical fiber provides two propagation paths for the optical signal, and one of the propagation paths in each example is faster than the other propagation path (i.e., the $LP_{11}$ propagation mode is faster than the $LP_{01}$ propagation mode, and light polarized along one axis of a birefringent fiber travels faster than light polarized along the other axis of a birefringent fiber). These known phenomena have been used to advantage to couple light between the two propagation modes by periodically stressing the fiber. For example, see "Active Polarization Coupler for Birefringent Fiber," J. L. Brooks, et al., *OPTICS LETTERS*, Vol. 9, No. 6, June 1984, pp. 249-251; "Birefringent Fiber Polarization Coupler," R. C. Youngquist, et al., *OPTICS LETTERS*, Vol. 8, No. 12, December, 1983, pp. 656-658; "Two-Mode Fiber Modal Coupler," R. C. Youngquist, et al., *OPTICS LETTERS*, Vol. 9, No. 5, May, 1984, pp. 177-179; and U.S. patent application Ser. No. 556,305, "Birefringent Fiber Narrow Band Polarization Coupler", filed Nov. 30, 1983, and assigned to the assignee of the present application (now abandoned). Each of the foregoing articles and the patent application are incorporated herein by reference.

It has also been found that if an optical fiber having two paths for propagation of an optical signal is periodically stressed by a traveling surface wave (e.g., a traveling surface acoustic wave) or a simulated traveling wave, the light energy of the optical signal traveling along one propagation mode can be coupled to another propagation mode and shifted in frequency by the magnitude of the frequency of the traveling wave. The frequency-shifted optical signal can be separated from the unshifted optical signal by using a modal coupler or a polarizer. Such frequency shifting devices have been described in the following articles: "Acousto-Optic Frequency Shifter for Single Mode Fibers," Nosu, et al., published at 47th International Conference on Integrated Optics and Optical Fiber Communications in Tokyo, June 27-30, 1983, and in *ELECTRONICS LETTERS*, Vol. 19, No. 20 (29 September, 1983); "Single-Sideband Frequency Shifting in Birefringent Optical Fiber", W. P. Risk, et al., SPIE, Vol. 478, *FIBER OPTICS AND LASER SENSORS II*, May, 1984, pp. 91-97; "Acousto-Optic Frequency Shifting in Birefringent Fiber," W. P. Risk, et al., *OPTICS LETTERS*, Vol. 9, No. 7, July 1984, pp. 309-311; "Acousto-Optic Birefringent Fiber Frequency Shifters," W. P. Risk, et al., *INTEGRATED AND GUIDED WAVE OPTICS CONFERENCE*, sponsored by the Quantum Electronics Group of IEEE and by the Optical Society of America, Kissimmee, Fla., (Apr. 24-26, 1984); and "Acoustic Fiber-Optic Modulators," W. P. Risk, et al., *PROCEEDINGS OF THE IEEE ULTRASONICS SYMPOSIUM*, Nov. 14-16, 1984, pp. 318-327. Acousto-optic frequency shifters are also disclosed in copending U.S. patent application Ser. No. 556,636, "Single Mode Fiber.Optic Single Sideband Modulator," filed Nov. 30, 1983 (U.S. Pat. No. 4,684,215); in copending U.S. patent application Ser. No. 581,176, "Acousto-Optic Frequency Shifter", filed on Feb. 17, 1984 (U.S. Pat. No. 4,735,485); and in "Acousto-optic Frequency Shifter Utilizing Multi-Turn Optical Fiber," U.S. patent application Ser. No. 699,666, filed on Feb. 8, 1985, (U.S. Pat. No. 4,735,484) all of which are assigned to the assignee of the instant application. The foregoing articles and patent applications are incorporated herein by reference.

As discussed in copending patent application Ser. No. 556,636 (U.S. Pat. No. 4,684,215), one approach to frequency shifting is to launch an actual acoustic wave (either a surface wave or a bulk wave) for propagation longitudinally along the length of an optical fiber. This approach has the advantage of providing a continuous, virtually infinite, number of coupling points which travel along the length of the fiber. However, it has been found that in order to achieve maximum coupling between propagation modes in an acousto-optic frequency shifter constructed in accordance with U.S. patent application Ser. No. 556,636 (U.S. Pat. No. 4,684,215), the acoustic wavelength should be substantially equal to the beat length of the optical energy traveling in the two propagation modes of the optical fiber. For example, in an exemplary commercially available high birefringence fiber, the minimum beat length between the optical energy traveling in the two polarization modes of the fiber is on the order of 1 mm. An acoustic wavelength of 1 mm corresponds to an acoustic frequency of about 1-5 MHz, depending upon the acoustic propagation velocity in the acoustic propagation medium (e.g., 3.4 MHz at 3411 meters/sec.). In order to obtain greater shifts in the optical frequency, a higher acoustic frequency must be used. However, since a higher acoustic frequency corresponds to a shorter acoustic wavelength, phase matching between the acoustic wave and the beat length of the optical fiber cannot be obtained by directing the acoustic wave colinearly with the propagation direction of the optical signals in the optical fiber. Thus, a number of techniques have developed in the art for propagating the acoustic wave at an angle with respect to the direction of propagation of the optical signal in the optical fiber. For example, the above-referenced copending patent application Ser. No. 581,176 (U.S. Pat. No. 4,735,485) discloses a fiber optic frequency shifter in which an acoustic transducer is positioned at an angle relative to an optical fiber such that the acoustic wave fronts of the acoustic wave generated by the transducer acoustically contact the fiber at an angle of incidence which is less than 90° and greater than 0°. When the acoustic wave fronts of the acoustic wave acoustically contact the fiber at an angle of incidence of 90°, the acoustic wave is propagating colinearly with the optical signals (i.e., the acoustic wave is propagating in the same direction as the optical signals) and when the acoustic wave fronts acoustically contact the fiber at an angle of incidence of 0°, the acoustic wave is propagating in a direction perpendicular to the direction of propagation of the optical signals. The angle of incidence can be chosen such that the shorter wavelengths of higher frequency acoustic waves can be matched with the longer beat lengths of the optical signal in the fiber. Thus, the maximum possible frequency shift can be substantially increased. A number of techniques are disclosed in U.S. Pat. application Ser. No. 581,176 (U.S. Pat. No. 4,735,485) to increase the concentration of acoustic energy impinging upon the optical fiber. For example, U.S. patent application Ser. No. 699,666 (U.S. Pat. No. 4,735,484) discloses an alternative apparatus for increasing the percentage of acoustic energy applied to the optical fiber by wrapping the optical fiber around the acoustic propagation means so that the propagating acoustic waves contact the optical fiber at a plurality of locations. The two techniques described in the two copending applications are further described in "Acousto-Optic Birefringent Fiber Frequency Shifters," W. P. Risk, et al., *INTEGRATED AND GUIDED WAVE OPTICS CONFERENCE*, sponsored by the Quantum Electronics Group of IEEE and by the Optical Society of America, Kissimmee, Fla., (Apr. 24–26, 1984); "Single-Sideband Frequency Shifting in Birefringent Optical Fiber", W. P. Risk, et al., SPIE, Vol 478, *FIBER OPTICS AND LASER SENSORS II*, May, 1984, pp. 91–97; "Acousto-Optic Frequency Shifting in Birefringent Fiber," W. P. Risk, et al., *OPTICS LETTERS*, Vol. 9, No. 7, July 1984, pp. 309–311; and "Acoustic Fiber-Optic Modulators," W. P. Risk, et al., *PROCEEDINGS OF THE IEEE ULTRASONICS SYMPOSIUM*, Nov. 14–16, 1984, pp. 318–327.

The devices described in the foregoing articles and copending patent applications require alignment of the optical fiber at an angle with the direction of propagation of the acoustic wave in order to achieve proper phase matching. In order to achieve the angular alignment, the acoustic wave must have broad wave fronts in order to affect a substantial length of the optical fiber. For an acoustic wave of a given width, the closer that the direction of propagation of the acoustic wave is to being perpendicular to the direction of propagation of the optical signal, the more power is required to couple optical energy from one propagation mode to the other propagation mode. Thus, a large amount of acoustic energy must be used to obtain substantial acoustic coupling. Alternatively, as described in copending patent application Ser. No. 699,666 (U.S. Pat. No. 4,735,484), the optical fiber can be precisely wound around the acoustic propagation medium so that the propagating acoustic wave provides a cumulative effect each time it passes across the optical fiber at the selected angle.

SUMMARY OF THE PRESENT INVENTION

The present invention is an apparatus and a method for shifting the frequency of an optical signal propagating in an optical fiber using an acoustic wave having a vector component propagating in the direction of propagation of the optical signal. Unlike the above-referenced earlier devices, the vector component of the acoustic wave propagating in the direction of propagation of the optical signal is not phase matched with the beat length of the optical signal. Rather, the vector component of the acoustic wave traveling in the direction of the optical signal has a wavelength in the direction of the optical signal which is smaller than the optical beat length. The acoustic wave contacts the optical fiber at plural spaced locations along the fiber, such that the acoustic energy is concentrated at the plural locations, thereby causing spatially periodic stress of the optical fiber by the acoustic wave. The periodic contact of the acoustic wave introduces a space harmonic into the coupling effect of the acoustic wave on the optical signal to compensate for the lack of phase matching between the acoustic wavelength and the fiber beat length. As a result of the periodic contact, an optical signal introduced into the optical fiber in one of two propagation modes is cumulatively coupled at the spaced apart locations to the other of the two propagation modes. The coupled light is shifted in frequency by an amount equal to the acoustic frequency.

Preferably, the spatially periodic contact of the acoustic wave with the optical fiber is caused by a periodic structure which pushes the optical fiber against an acoustic propagation medium at the spaced apart locations. The distance between adjacent spaced apart locations and the length of each spaced apart location are selected so that the spaced apart locations are spatially periodic along the length of the optical fiber. The periodicity of the periodic structure is selected as a function of the optical beat length of the optical fiber at the optical frequency and as a function of the selected frequency shift. In the preferred embodiment, the length between corresponding portions of the periodic locations (i.e., the length of the periodicity), designated as $\Lambda_g$, is selected according to the following relationship:

$$\Lambda_g = \frac{1}{\frac{1}{\Lambda_a} - \frac{1}{L_B}}$$

where $\Lambda_a$ is the acoustic wavelength of the acoustic signal in the direction of propagation of the optical signal in the optical fiber, and where $L_B$ is the beat length of the optical signal propagating in the two propagation modes of the optical fiber.

The present invention can also be understood in terms of the propagation constants of the optical signal, the propagation constant of the acoustic signal, and a static constant, which will be referred to herein as the spatial propagation constant of a periodic structure employed to cause the periodic contact of the acoustic wave with the optical fiber. The relationship among the foregoing constants can be represented mathematically as: $k_2 - k_1 = k_a - k_g$, where $k_2$ is the propagation constant of the slow optical propagation mode, $k_1$ is the propagation constant of the fast optical propagation mode, $k_a$ is the propagation constant of the acoustic wave, and $k_g$ (the spatial propagation constant of the periodic contact of the acoustic wave) is equal to $2\pi/\Lambda_g$. The acoustic propagation constant depends on the acoustic wave frequency, while the spatial propagation constant depends on the periodicity of the acoustic contact. Thus, the spatial propagation constant of the periodic structure provides a means for matching the propagation constant of an acoustic wave with the difference in the propagation constants of the two optical propagation modes. Accordingly, the use of the periodic structure in conjunction with the traveling acoustic wave provides a means for using an acoustic wave of higher frequency to achieve a larger shift in the frequency of an optical signal than would otherwise be possible. In the preferred embodiment, the direction of propagation of the acoustic wave is colinear with that of the optical signal. This advantageously permits the acoustic wave to be concentrated in a small area proximate to the optical fiber. Thus, for a given amount of acoustic power, a greater percentage of the optical signal can be coupled from an input propagation mode to an output propagation mode at a shifted frequency.

BRIEF DESCRIPTION OF THE DRAWINGS

These and other features of the present invention may best be understood through reference to the drawings in which:

FIG. 7 is a schematic diagram of an optical fiber and an acoustic transducer, showing the acoustic wave fronts generated by such transducer directed to acoustically contact the fiber at an angle thereto, and illustrating that, for proper phase matching of the acoustic wave to the beat pattern of the fiber, the angle should be selected such that the distance between adjacent wave fronts as measured along the fiber is equal to the beat length of the fiber;

FIG. 8 is a diagram showing the relationship between the angle of incidence, beat length, and acoustic wave length required for proper phase matching of the acoustic wave to the beat pattern of the fiber;

FIG. 9 is a graph of acoustic frequency as a function of the angle of incidence, illustrating that small angles of incidence permit the use of acoustic frequencies which are quite high, and yield correspondingly high frequency shifts;

FIG. 13 is a partial elevational view of the embodiment of FIGS. 11 and 12 illustrating the alternating acoustically stressed and acoustically unstressed regions caused by the contact of the fiber with the acoustic propagation medium;

FIG. 19 is an alternative embodiment of the present invention in which the optical fiber has portions of its cladding periodically removed to create spaced apart locations of the optical fiber which can be positioned in acoustic contact with a traveling acoustic wave;

FIG. 20 is an alternative embodiment of the present invention in which the acoustic propagation means is notched to create periodic locations for contact with the optical fiber so that the acoustic wave propagating in the acoustic propagation means causes periodic stresses to the optical fiber; and FIG. 21 is a pictorial representation of the present invention in which the periodic structure and the acoustic waves are positioned at angles with respect to the optical propagation axis of an optical fiber to provide a means for fine tuning the coupling from one propagation mode to the other propagation mode.

DETAILED DESCRIPTION OF THE PREFERRED EMBODIMENT

The theory of operation of the present invention will be presented initially, followed by a description of the physical structure of the embodiment of the present invention. Additional information regarding the theory of frequency shifting in birefringent optical fibers can be found in "Acousto-optic Frequency Shifting in Birefringent Fiber," W. P. Risk, et al., *OPTICS LETTERS*, Vol. 9, No. 7, July 1984, pps. 309–311; "Single-Sideband Frequency Shifting in Birefringent Optical Fiber," W. P.

Risk, et al., SPIE Vol. 478, *FIBER OPTICS AND LASER SENSORS II*, May 1984, pgs. 91–97; "Acousto-Optic Birefringent Fiber Frequency Shifters," W. P. Risk, et al., *INTEGRATED AND GUIDED WAVE OPTICS CONFERENCE*, sponsored by the Quantum Electronics Group of IEEE and by the Optical Society of America, Kissimmee, Fla., (Apr. 24–26, 1984); "Acoustic Fiber-Optic Modulators," W. P. Risk, et al., *PROCEEDINGS OF THE IEEE ULTRASONICS SYMPOSIUM*, Nov. 14–16, 1984, pp. 318–327.

Figure 1:
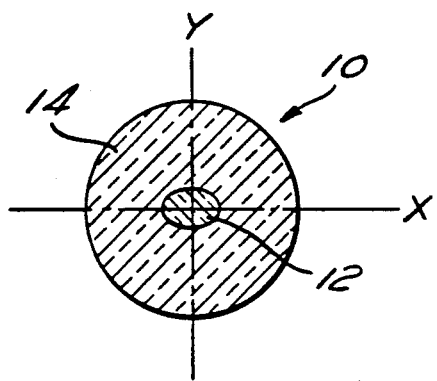
FIG. 1 is a cross-sectional view illustrating the two orthogonal axes of birefringence of a single-mode high birefringence fiber.

In one embodiment of the frequency shifter of the present invention, a birefringent single mode optical fiber is used. A cross-section of an exemplary birefringent single mode optical fiber 10 is illustrated in FIG. 1. The optical fiber 10 has an elliptical central core 12 having a relatively high index of refraction and has a surrounding cladding 14 which has a relatively low index of refraction. As is well known, a birefringent optical fiber has two orthogonal principal axes of birefringence, each of which corresponds to a polarization mode or optical propagation path through the fiber 10. These axes are labeled X and Y in FIG. 1. Each axis has a different effective refractive index. The difference in effective refractive indices (i.e., $\Delta n_{eff}$) is referred to as the birefringence of the optical fiber 10. In the absence of perturbations of these axes, light which is linearly polarized along either of these two axes will remain linearly polarized as it propagates down the fiber 10. In general, light of any polarization can be regarded as a superposition of these two linearly polarized modes.

The two polarization modes of birefringent single mode optical fiber propagate light at slightly different velocities because of the differences in the refractive indices. Therefore, the phase of light propagating in the X-axis polarization mode will change relative to that in the Y-axis polarization mode as the light propagates down the fiber. The distance, measured longitudinally along the fiber, required for light in one mode to separate in phase by 360 degrees ($2\pi$ radians) relative to the light in the other mode is commonly referred to as the "beat length" of the fiber. Mathematically, the beat length may be defined as follows:

$$L_B = \frac{\lambda}{\Delta n_{eff}} \quad (1)$$

Where $L_B$ is the beat length, is the free-space wavelength of the light, and $\Delta n$ is the difference in the indices of refraction for the two polarization modes.

From Equation 1, it may be seen that the beat length is inversely proportional to the difference in the indices of refraction of the two optical propagation paths corresponding to the two polarization modes. Thus, the beat length is inversely proportional to the birefringence of the fiber 10. Consequently, a fiber having a relatively high birefringence has a shorter beat length than a fiber having a relatively low birefringence. One common technique for fabricating a high birefringence fiber is to draw the fiber such that the core has an elliptical shape, as illustrated by the core 12 in FIG. 1. In an exemplary embodiment of the present invention, an elliptical core fiber manufactured by Andrew Corporation has a Y-axis measuring approximately one micrometer and has an X-axis measuring approximately two micrometers. The birefringence of the two axes of the core is approximately $3.72 \times 10^{-4}$ which provides a beat length of 1.7 millimeters at an optical wavelength of 633 nanometers. The outer diameter of the cladding of the fiber is approximately 50 micrometers.

High birefringence fibers are advantageous in that the polarization modes are well-defined, and thus, the polarization of the applied light will be maintained over relatively long lengths of fiber, without significant coupling of light between the polarization modes. Thus, the polarization modes of a high birefringence fiber may be viewed as independent optical paths through the fiber, which are normally uncoupled such that light is not transferred between them.

As discussed in co-pending U.S. patent application Ser. No. 556,305 filed Nov. 30, 1983, abandoned entitled "Birefringent Fiber Narrow Band Polarization Coupler"; copending U.S. patent application Ser. No. 556,636 filed Nov. 30, 1983, entitled "Single Mode Fiber Optic Single Sideband Modulator" now issued as U.S. Pat. No. 4,684,215; and an article entitled "Birefringent Fiber Polarization Coupler, *OPTICS LETTERS* Vol. 8, No. 12 (December, 1983) pp. 656–658, selective coupling of light between the polarization modes of a birefringent single mode fiber may be achieved by applying a force to the birefringent fiber at an angle of about 45° relevant to the principal axes of birefringence. Such force may be applied by squeezing the fiber between two plates on opposing sides of the fiber. Application of such force perturbs the axes of birefringence at the point of force, and causes the axes of birefringence to be rotated through a small angle. Consequently, when light launched in one linearly polarized mode reaches the localized perturbation, the light will decompose into a superposition of modes linearly polarized along the perturbed axes of birefringence, effectively coupling light from one polarization mode to the other. The coupled light is not frequency shifted because the stresses in the fiber are static and do not travel down the fiber.

Figure 2:
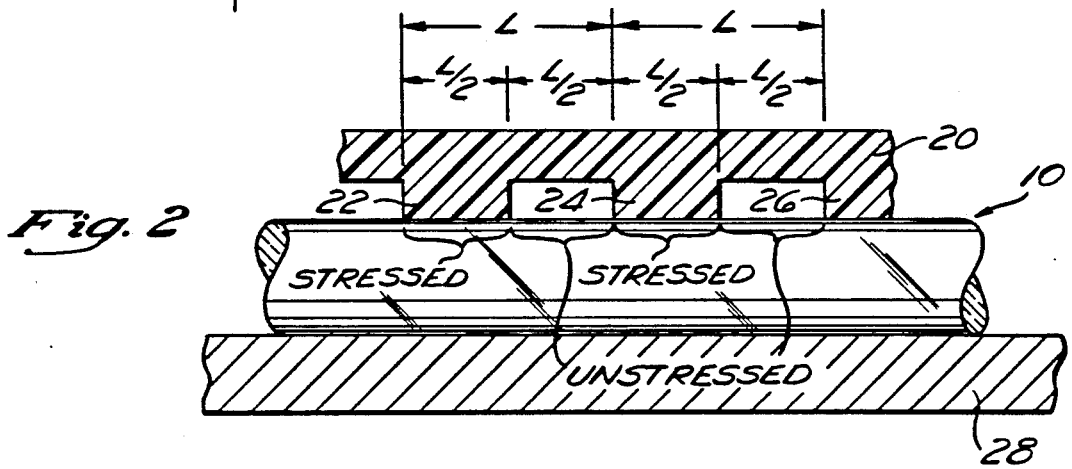
FIG. 2 is an elevation view in partial cross-section which schematically shows a polarization coupler comprising a ridge structure for creating alternate stressed and unstressed regions in an optical fiber to cause coupling between the polarization modes of the optical fiber.

The foregoing may be more fully understood through reference to FIG. 2 which schematically depicts a ridge structure 20 comprising plural ridges 22, 24, 26 at spaced intervals. The fiber 10 is disposed between the ridges 22, 24, 26 and a base block 28, so that the fiber 10 may be squeezed therebetween. Application of force to the ridge structure 20 in a direction normal to the longitudinal axis of the fiber 10 perturbs the axes of birefringence at each of the ridges 22, 24, 26 and provides alternate stressed and unstressed regions along the fiber 10 which cause coupling between the two polarization modes of the fiber 10. For maximum coupling between the modes, it is preferable that the ridges 22, 24, 26 be spaced at beat length intervals and that the length of each ridge be one half beat length. Satisfying these conditions causes the coupling at each ridge 22, 24, 26 to be cumulative with the coupling at the other ridges 22, 24, 26. By providing a sufficient number of ridges 22, 24, 26, one hundred percent of light input to one of the polarization modes can be coupled to the other of the polarization modes. A more complete description of this coupling phenomenon may be found in the above referenced articles and patent applications, which are hereby incorporated by reference herein.

Figure 3:
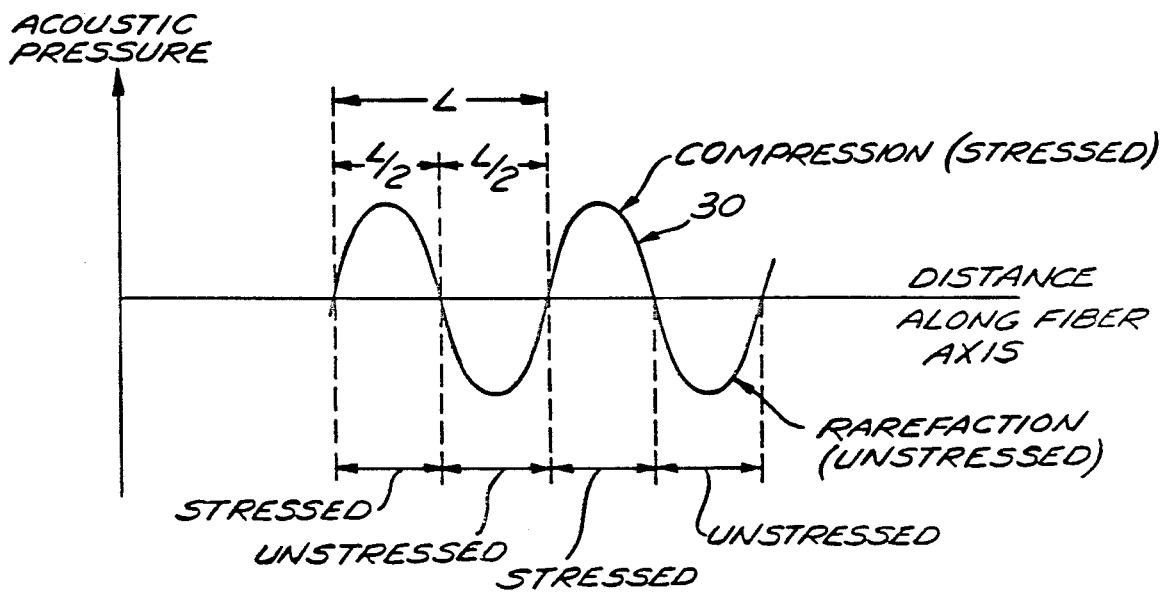
FIG. 3 is a graph of acoustic pressure versus the distance along the axis of an optical fiber, illustrating regions of compression and rarefaction caused by the wave front of a traveling acoustic wave which provide corresponding stressed and unstressed regions in the optical fiber.

The alternate stressed and unstressed regions provided by the ridge structure 20 of FIG. 2 may be alternatively provided by an actual traveling acoustic wave, such as the acoustic wave 30 of FIG. 3, which is launched to propagate longitudinally along the central axis of the fiber 10. The periodicity of the traveling acoustic wave 30 provides alternating regions of compression and rarefaction so as to provide corresponding alternating stressed and unstressed regions in the fiber, and thus, cause coupling between the polarization modes of the fiber. For maximum coupling, it is preferable that the wavelength of the acoustic wave 30 be selected such that it is equal to the beat length of the fiber 10. Since the acoustic wave is sinusoidal, each of the alternating regions of compression and rarefaction will then be one-half beat length in length, and thus, each of the alternating stressed and unstressed regions will also be one-half beat length in length. From the foregoing, it will be understood that the acoustic wave 30 of FIG. 3, by providing alternating half beat length stressed and unstressed regions along the fiber 10, cumulatively couples light between the polarization modes of the fiber in much the same manner as the half beat length ridges 22, 24, 26 of FIG. 2. In addition, it should be understood that, while an acoustic wavelength which is equal to the fiber beat length is preferred for maximum coupling, cumulative coupling will also occur if the wavelength is an odd multiple of beat lengths.

In contrast to the ridged structure 20 of FIG. 2 in which the fiber stresses produced by the ridges 22, 24, 26 are static, the fiber stress pattern produced by the traveling acoustic wave 30 of FIG. 3 travels down the fiber 10. Such travel of the stress pattern causes the light coupled from one polarization mode to the other to be shifted in frequency much as light from a moving source is Doppler shifted. In effect, the optical carrier wave and the acoustic wave are heterodyned such that the acoustic frequency and the optical carrier frequency combine either additively or subtractively to provide a side band at either the sum or the difference frequency. If the acoustic wave propagates in the same direction as the light, light coupled from the faster polarization mode to the slower polarization mode is upshifted in frequency, while light propagating from the slower polarization mode to the faster polarization mode is downshifted in frequency. If the acoustic wave propagates in a direction opposite to that of the optical carrier, these relationships are reversed, so that light coupled from the faster mode to the slower mode is downshifted, while light coupled from the slower mode to the faster mode is upshifted.

Frequency shifted coupling requires that the acoustic wave be properly phased matched to the beat pattern of the optical modes in the fiber. In FIG. 3, such phase matching occurs when the acoustic wavelength, as measured along the axis of the fiber 10 is equal to the beat length of the fiber. Stated differently, the propagation constant $k_1$ of the faster mode (lower effective refractive index), the propagation constant $k_2$ of the slower mode (higher effective refractive index), and the propagation constant $k_a$ of the acoustic wave should satisfy the following relationship:

$$k_1 + k_a 32\ k_2 \tag{2}$$

The acoustic propagation constant $k_a$ is the component of the acoustic propagation constant that is aligned with the optical propagation axis of the fiber.

The frequency shifted coupling of light between the polarization modes may be examined mathematically by representing the light in the fast optical mode as $\cos(\omega_1 t - k_1 z)$, where $\omega_1$ is the angular frequency of the light, t is time, and z is the distance along the fiber axis. The acoustic wave may be represented as $\cos(\omega_a t - k_a z)$, where $\omega_a$ is the angular frequency of the acoustic wave. The interaction of these two waves leads to a product term proportional to:

$$\tfrac{1}{2}\{\cos[(\omega_1+\omega_a)t-(k_1+k_a)z]+\cos[(\omega_1-\omega_a)t-(k_1-k_a)z]\} \tag{3}$$

The second term of Expression 3 does not satisfy the phase matching condition of Equation 2, and thus, it is expected that the signal represented by this term will die away. The first term, however, is phase matched to the slow mode, in accordance with expression (2), and explicitly indicates that the slow mode is upshifted. A similar analysis shows that if the slow mode interacts with the acoustic wave, the expression for the resulting interaction is:

$$\tfrac{1}{2}\{\cos[(\omega_1-\omega_a)t-(k_2-k_a)z]+\cos[(\omega_1+\omega_a)t-(k_2+k_a)z]\} \tag{4}$$

The second term of Expression 4, like the second term of Expression 3, is not phased matched, however, the first term is phased matched to the fast mode in accordance with equation (2) and explicitly describes a downshifted wave.

Figure 4:
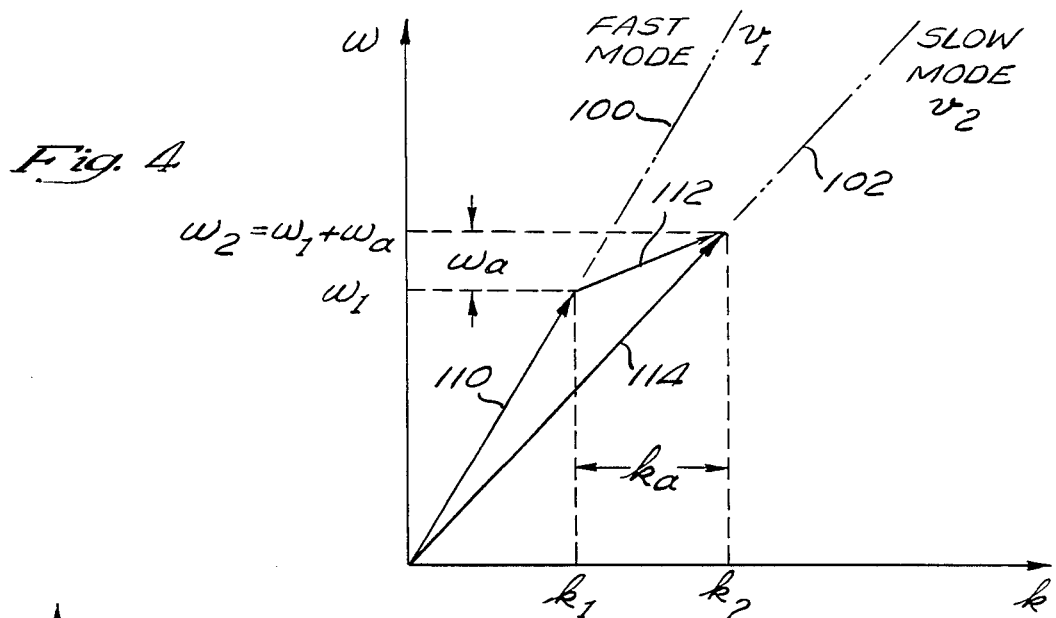
FIG. 4 is an $\omega$-k diagram illustrating the frequency shifting effect of a traveling acoustic wave when optical energy is caused to be coupled from the fast propagation mode to the slow propagation mode.

The foregoing analyses can be represented graphically as illustrated in FIG. 4. The horizontal axis of the graph represents the magnitude of the propagation constant of the optical signal in the optical fiber 10. The vertical axis represents the magnitude of the frequency of the optical signal in the optical fiber 10. The relationship between the propagation constant and the frequency of an optical signal is dependent upon the propagation velocity in accordance with the following equations:

$$v_1 = \omega_1/k_1 \tag{5}$$

$$v_2 = \omega_2/k_2 \tag{6}$$

where $v_1$ and $v_2$ are the propagation velocities of the optical signals in the fast propagation mode and the slow propagation mode, respectively; $\omega_1$ and $\omega_2$ are the frequencies of the optical signals in the fast propagation mode and slow propagation mode, respectively; and $k_1$ and $k_2$ are the propagation constants of the optical signals in the fast propagation mode and slow propagation mode, respectively. A phantom line 100, representing the velocity $v_1$ of the optical signal in the fast propagation mode, has a greater slope (i.e., $\Delta\omega/\Delta k$) than the slope of a phantom line 102, representing the velocity $v_2$ of the slow propagation mode. A vector 110, superimposed on the velocity line 100, has a length determined by the frequency $\omega_1$ and propagation constant $k_1$ of the optical signal input into the fiber 10 in the fast propagation mode. A vector 112, represents the acoustic wave 30 and has a slope, representing the velocity $v_a$ of the acoustic wave 30, in accordance with the following equation:

$$v_a = \omega_a/k_a \tag{7}$$

The length of the vector 112 is determined by the frequency $\omega_a$ and is thus determined by the propagation constant $k_a$. The vector 112 is added to the vector 110 to obtain a resulting vector 114 having a length on the k-axis equal to the sum of the optical propagation constant $k_1$ plus the acoustic propagation constant $k_a$ (i.e., $k_2 = k_1 + k_a$); and having a length along the $\omega$-axis equal to the sum of the input optical frequency $\omega_1$ plus the acoustic frequency $\omega_a$ (i.e., $\omega_2=\omega_1+\omega_a$). In the example presented, the resulting vector has a slope equal to the velocity $v_2$ of the slow propagation mode so that the vector satisfies the phase matching condition for propagation along the optical path provided by the slow propagation mode.

Figure 5:
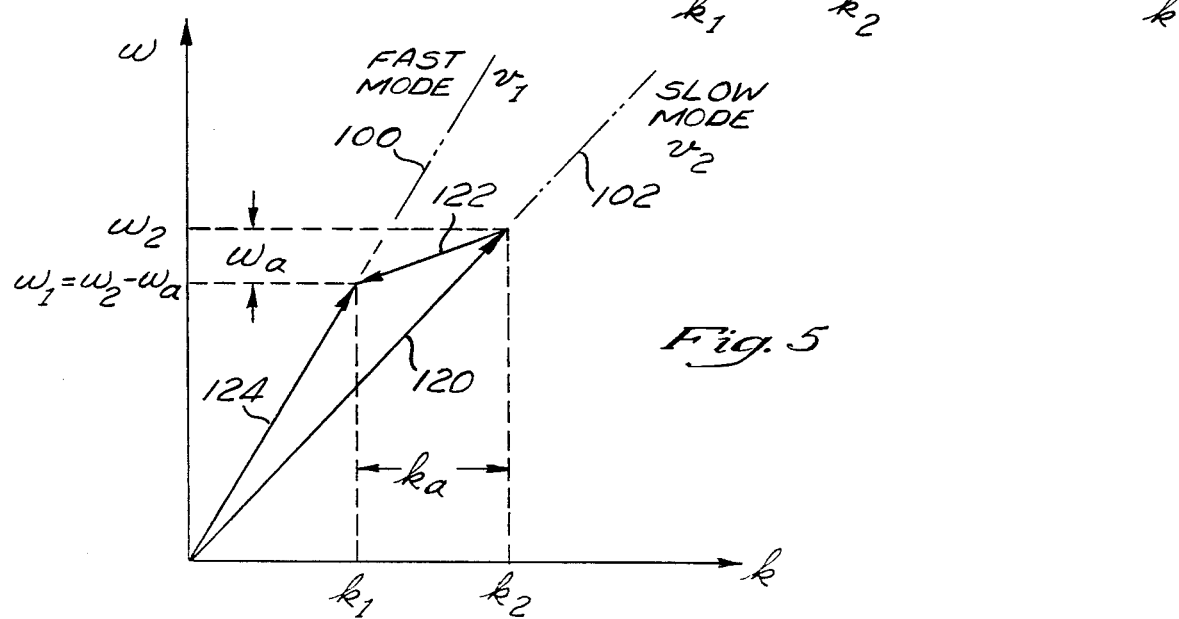
FIG. 5 is an $\omega$-k diagram illustrating the frequency shifting effect of a traveling acoustic wave when optical energy is caused to be coupled from the slow propagation mode to the fast propagation mode.

In like manner, FIG. 5 illustrates the phase-matching condition of Expression 4. A vector 120 represents the input optical signal in the slow propagation mode having a velocity $v_2$, a frequency $\omega_2$ and a propagation constant $k_2$. In accordance with Expression 4, a vector 122, representing the acoustic wave 30, is subtracted from the vector 120 to obtain a vector 124 having a length along the $\omega$-axis of $\omega_1=\omega_2-w_a$; and having a length along the k-axis of $k_1=k_2-k_a$. As illustrated, the resulting vector has a slope of $\omega_1/k_1$ which corresponds to the slope of the graph 100 of the velocity $v_1$ for the fast propagation mode. Thus, the vector 124 represents an optical signal satisfying the phase-matching conditions for propagation in the fast optical propagation mode.

One skilled in the art will appreciate that the graphical relationships depicted in FIGS. 4 and 5 have been exaggerated for illustrative purposes. The actual optical frequencies and velocities are so much greater than the acoustic frequencies and velocities that it is not practical to graph the relationship with dimensions proportional to the respective frequencies and velocities. One skilled in the art will also understand that the graph 100 and the graph 102 representing the two polarization modes are not necessarily straight lines as illustrated. Thus, it should be understood that the phase-matching conditions are met when the tip of the resulting vector 114 in FIG. 4 is on the graph 102. Similarly, phase-matching conditions are met when the resulting vector 124 in FIG. 5 is on the graph 100.

Figure 6:
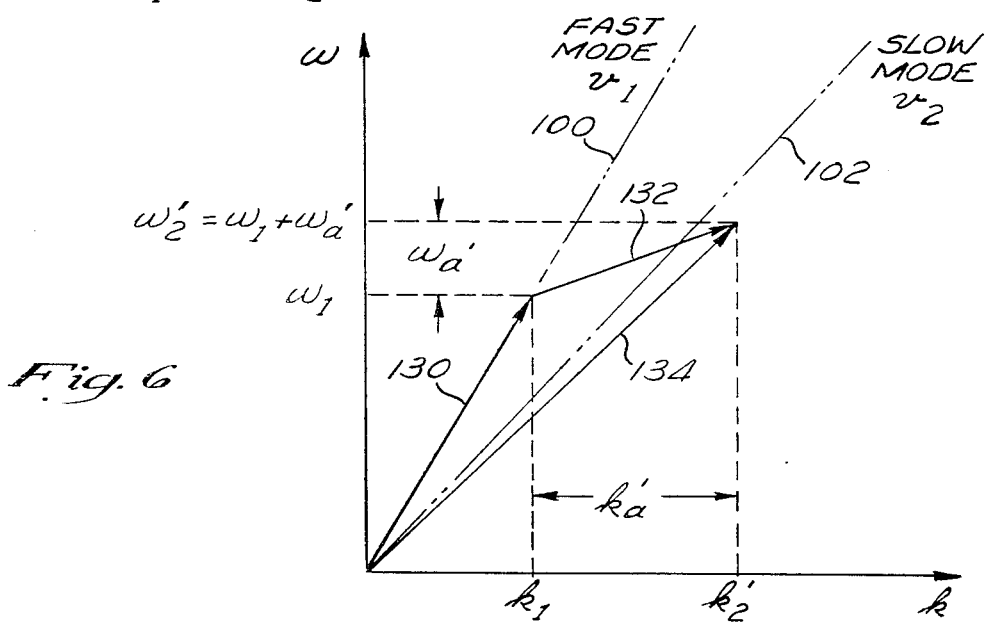
FIG. 6 is an $\omega$-k diagram illustrating the mismatching effect which occurs when the frequency shifted optical energy cannot be supported in the mode to which it has been coupled.

FIG. 6 graphically illustrates the result of using a higher frequency acoustic signal (e.g., an acoustic signal having a frequency $\omega_a'$) such that the phase matching conditions are not met. A vector 130 represents the input optical signal in the fast propagation having a frequency $\omega_1$ and a propagation constant $k_1$, corresponding to the velocity $v_1$. A vector 132 represents the acoustic signal having a frequency $\omega_a'$ and a propagation constant $k_a'$. Assuming that the propagation velocity $v_a$ of the acoustic wave is the same as before, the acoustic vector 132 is necessarily longer than the corresponding acoustic vector 112 in FIG. 4. Thus, a vector 134 representing the sum of the vector 130 and the vector 132, has a magnitude along the $\omega$-axis of $\omega_2'=\omega_1+\omega_a'$ and a magnitude along the k-axis of $k_2'=k_1+k_a'$. However, unlike the vector 114 in FIG. 4, the vector 134 does not have a slope corresponding to the slope of the velocity graph 102 for the slow propagation mode. Thus, the frequency-shifted optical signal is not properly phase-matched for propagation in the slow propagation mode and will not be supported in that propagation mode.

The foregoing phase matching requirements indicate that, for an acoustic wave propagating longitudinally down the fiber with the wave fronts normal to the fiber axis (i.e., an acoustic wave that propagates colinearly with the direction of propagation of the optical signals in the fiber), the acoustic wave frequency should be such that its wavelength is equal to the fiber beat length for the optical signal. Since fiber beat lengths are typically on the order 1 mm or more, (e.g., 1.7 mm) the maximum available frequency shift from such longitudinally propagating acoustic wave is on the order of only a few megahertz.

FIG. 7 schematically illustrates a frequency shifter which circumvents this limitation by positioning an acoustic transducer 140 to produce an acoustic wave 142 that propagates in a direction, e.g., as indicated by the arrow 143, which is at an angle to the central axis 148 of a high birefringence single-mode optical fiber 146. Such positioning causes the wave fronts 144 of the wave 142 to be directed to acoustically contact the highly birefringent single-mode optical fiber 146 at an angle $\theta$, referred to herein as "the angle of incidence." As used herein, the term "angle of incidence" is defined as the acute angle between a wave front of an acoustic wave impinging on the fiber and the longitudinal central axis 148 of that fiber. The wavelength $\lambda_a$ (which is measured in the direction of propagation 143) of the acoustic wave 144 and the angle of incidence, $\theta$, are preferably selected such that adjacent wave fronts 144 are spaced by one fiber beat length, L, which is measured in a direction along the fiber axis 148. This beat length spacing of the wave fronts 144 satisfies the phase matching conditions set forth above, and thus, the component of acoustic propagation along the fiber axis 148 will satisfy Equation 2, above. This arrangement permits the use of much shorter acoustic wavelengths, and thus, much higher acoustic frequencies than with a colinearly propagating acoustic wave, while still satisfying the phase matching condition. As illustrated in FIG. 8, simple trigonometry shows that the phase matching condition will be satisfied when:

$$\lambda_a = L \sin \theta \tag{8}$$

Accordingly, by varying the angle of incidence, $\theta$, the acoustic wavelength, and thus, the acoustic frequency may be readily changed. Equation 8 may be rewritten in terms of the acoustic frequency $\omega_a$, as follows:

$$\omega_a = \frac{2\pi v_a}{L \sin \theta} \tag{9}$$

where $v_a$ is the propagation velocity of the acoustic wave in the direction 143.

FIG. 9 graphically illustrates the relationship between the acoustic frequency $\omega_a$ and the angle of incidence $\theta$, and shows that for very small angles of incidence (e.g., a few degrees or a fraction of a degree), the acoustic frequency utilized may be quite high. Note that the acoustic frequency $\omega_a$ is at a minimum when $\theta$ equals 90° (i.e., when the acoustic wave fronts are normal to the fiber). By way of example, an angle of incidence of 3° would permit use of an acoustic frequency of 95 MHz for a fiber having a 1 mm beat length.

The device of FIG. 7 may also be analyzed in terms of the "propagation phase velocity" of the acoustic wave. The term "propagation phase velocity," as used herein, is defined as the velocity, measured along a particular line of measurement (e.g., the direction 143 or axis 148), with which the intersection of a wave front (e.g., one of the wave fronts 144) and that axis of measurement move. Thus, for a particular wave front 144, that wave front will have a "propagation phase velocity" which is peculiar to the axis of measurement which is selected. The propagation phase velocity along the line 143 is equal to the rate at which the wave front moves along that line. Similarly, the propagation phase velocity along the fiber axis 148 is the rate at which the wave front moves along that axis. The propagation phase velocity of the acoustic wave in the direction of propagation 143 is independent of the angle of incidence. However, the propagation phase velocity of the acoustic wave fronts in the direction of the fiber axis 148 increases as the angle of incidence decreases and decreases as the angle of incidence increases. Thus, by directing the wave 142 at an angle relative to the fiber 146, the propagation phase velocity of the wave fronts 144 will be higher in the direction along the fiber axis 148 than along the direction of propagation 143. In general, for a given acoustic propagation velocity and frequency, the closer the angle of incidence is to 0°, the higher the propagation phase velocity along the fiber axis. Further, the higher the propagation phase velocity, the higher the acoustic frequency can be, while still maintaining the proper phase matching conditions. Thus, directing the acoustic wave at an angle to the fiber increases the propagation phase velocity in the direction of the fiber axis and thereby permits a high frequency acoustic signal to be matched with a fiber having a relatively long beat length.

Figure 10:
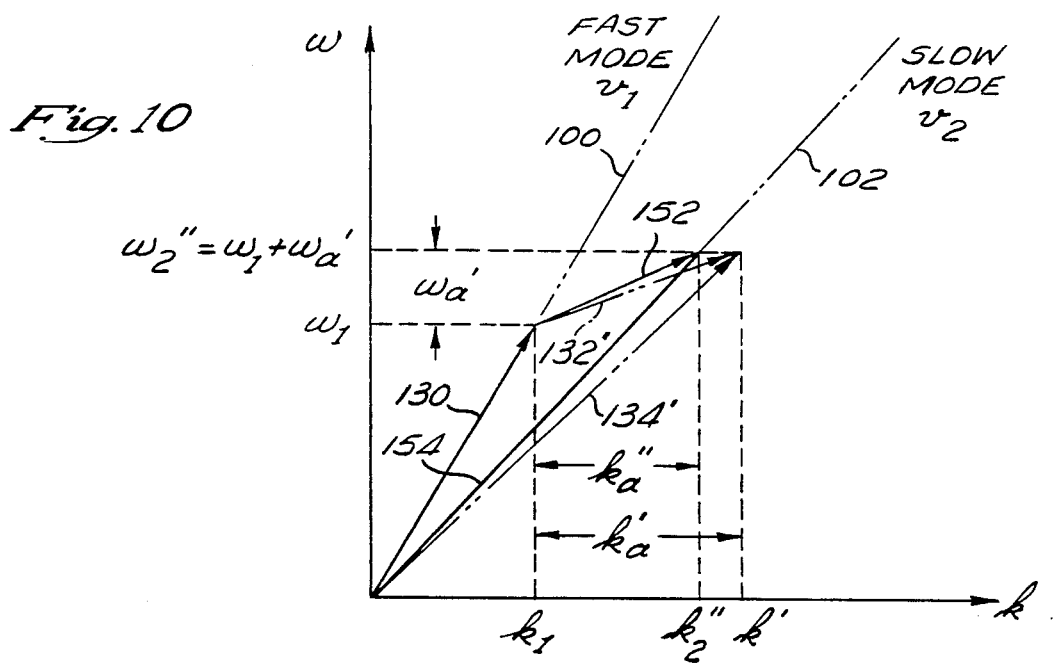
FIG. 10 is an $\omega$-k diagram showing the effect of angling the acoustic wave propagation direction with respect to the direction of propagation of the optical signals so that the light coupled from one propagation mode to the other propagation mode is shifted in frequency and has a propagation constant which matches the propagation constant of the slow propagation mode for the shifted frequency.

The foregoing can be demonstrated graphically as illustrated in FIG. 10. In FIG. 10, the vector 130 represents the optical signal propagating in the fast optical propagation mode as in FIG. 6. A vector 132' (in phantom) corresponds to the vector 132 in FIG. 6 and a vector 134' (in phantom) corresponds to the vector 134 in FIG. 6. In FIG. 10, a vector 152 represents the acoustic signal 143 of FIG. 7 directed at an angle with respect to the fiber 146 so that the effective propagation phase velocity of the acoustic wave is increased. Thus, as illustrated, the slope of the acoustic wave vector 152 is greater than the slope of the acoustic wave vector 132'. Since the frequency of the acoustic wave represented by the vector 152 has not changed with respect to the frequency of the acoustic wave represented by the vector 132 in FIG. 6, the magnitude of the acoustic frequency is again shown as $\omega_a'$. However, increasing the velocity of the acoustic wave has the effect of reducing the propagation constant from $k_a'$ (shown in phantom) to $k_a''$. Thus, a vector 154, representing the frequency shifted optical signal has a length along the $\omega$-axis of $\omega_2'' = \omega_1 + \omega_a'$ and has a length along the k-axis of $k_2'' = k_1 + k_a''$. As illustrated in FIG. 10, the acoustic propagation velocity along the length of the optical fiber is elected so that the vector 154 has a slope (i.e., velocity) corresponding to the velocity $v_2$ of an optical signal propagating in the slow propagation mode. Thus, the vector 154 represents an optical signal that has been phase-matched with the slow propagation mode by angling the acoustic wave 143 with respect to the optical propagation axis 148 of the optical fiber 146.

While the above-described angled approach has produced nearly 100% coupling from one polarization mode to the other, the electrical input power required to achieve this efficiency is quite large (e.g., approximately 25 watts). Furthermore, since the acoustic wave has to be directed at an angle to the optical fiber, the width of the acoustic propagation mode must be relatively large so that the acoustic wave has a width sufficient to impinge upon a significant length of optical fiber. Thus, it is desirable to find a method to achieve phase matching to a high frequency acoustic wave propagating in the direction of a fiber so that the acoustic wave can be confined to a waveguide. This would increase the acoustic power density in the region of the fiber and thereby reduce the input power needed to obtain a given degree of coupling.

The present invention, in its preferred embodiment, utilizes an acoustic wave having a propagation direction which is colinear with that of the optical signal. The preferred embodiment achieves colinear phase matching between a propagating acoustic wave at frequencies above the usual colinear phase matching frequency. For example, for the above-described elliptical core birefringent fiber, a beat length of approximately 1.7 millimeters and an acoustic propagation velocity of approximately 3411 meters per second (the value for a Rayleigh wave on fused quartz) would limit the acoustic frequency to 2.0 MHz to obtain proper phase matching between the optical beat lengths and the acoustic wave when the acoustic wave is directed to propagate colinearly with the axis of the fiber. Thus, the optical frequency could only be upshifted or downshifted by a maximum of approximately 2 MHz. In order to obtain increased frequency shifting without directing the acoustic wave at an angle with respect to the direction of propagation of the optical fiber, the present invention is constructed so as to cause the colinearly propagating acoustic wave to affect the optical fiber only at periodically spaced locations on the fiber. Although the preferred embodiment utilizes colinear propagation of the acoustic wave and optical signal, it will be understood that the invention may also be used with an angled wave such as was described in connection with FIG. 7.

Figure 12:
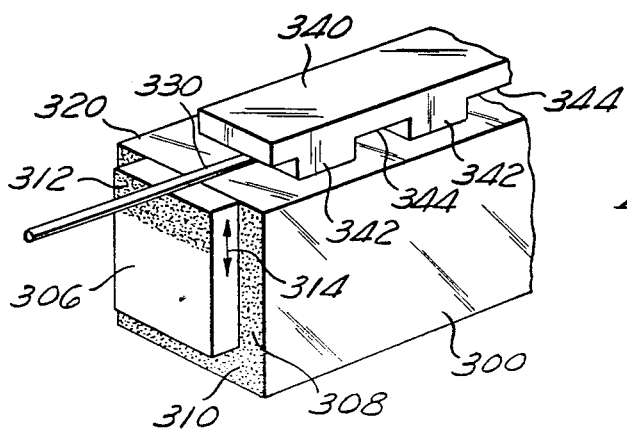
FIG. 12 is an enlarged view of one end of the embodiment of FIG. 11 further illustrating the construction of the transducer that generates the acoustic signals in the acoustic propagation medium.
Figure 11:
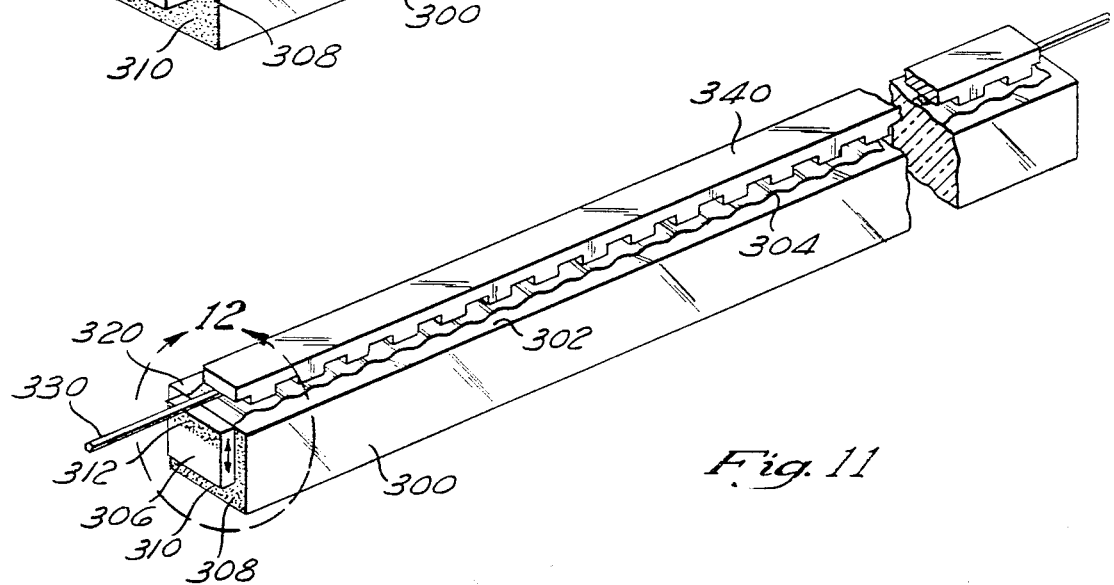
FIG. 11 is a perspective drawing illustrating the present invention in which a periodic structure is used to cause an optical fiber to periodically contact an acoustic wave propagating colinearly with the optical signals in the optical fiber.

FIG. 11 illustrates one embodiment of the present invention. The embodiment of FIG. 11 includes a substrate 300 having a top surface 302 which provides an acoustic propagation path for an acoustic wave 304, shown pictorially in FIG. 11. An acoustic transducer 306, shown in more detail in FIG. 12, is positioned at one end 308 of the substrate 300. The acoustic transducer 306 comprises a slab of piezoelectric material, such as PZT (lead-zirconate-titanate) mounted in a conventional manner at the end 308 of the substrate 300. A pair of electrodes 310, 312 are formed on opposing sides of the transducer 306 to provide a driving means for the transducer 306. In the illustrated embodiment, the end 308 of the substrate 300 has a thin layer of Cr-Au deposited thereon to form the first electrode 310. The PZT transducer 306 is mounted thereon by conventional means (e.g., by bonding one side of the transducer 306 to the Cr-Au electrode 310). The second electrode 312 is formed by depositing a layer of Cr-Au on the opposite side of the PZ transducer 306 from the electrode 310. When an alternating electric voltage (not shown) is applied to the first electrode 310 and to the second electrode 312, the PZT transducer 306 oscillates at the frequency of the applied electrical voltage. The PZT material of the transducer 306 is selected to oscillate in the shear mode represented by the double-headed arrow 314. Since the PZT material 306 is bonded to the end of the substrate 300, a surface acoustic wave is generated on the top surface 302 of the substrate 300 and propagates away from the transducer 306, as illustrated in FIG. 11. Preferably, the second electrode 312 is formed on only a portion of the PZT material 306 so that the shearing action, represented by the double-headed arrow 314, is concentrated near the top surface 320 of the substrate 300. Thus, the generated acoustic energy is concentrated near the top surface 302 of the substrate 300. Preferably, the top surface 302 is configured as a narrow acoustic waveguide to confine the acoustic wave energy to propagate in a narrow channel. Thus, the acoustic energy generated by the transducer 306 is well-guided as it propagates away from the transducer.

An optical fiber 330 is placed on the top surface 302 of the substrate 300 in contact with the traveling acoustic wave 304 generated by the transducer 300. In order to provide periodic acoustic contact between the top surface 302 and the optical fiber 330, a periodic structure, such as a ridged grating 340, is provided to apply a small amount of force to the optical fiber 330 to force it against the top surface 302 of the substrate 300 at periodic locations. Except for the periodicity of its ridges, the ridged grating 340 is similar to the ridged block 20, described above in connection with FIG. 2. However, the force applied to the ridged grating 340 is sufficient only to provide good acoustic contact between the optical fiber 330 and the top surface 302 substantially exclusively at the periodic locations defined by the ridges. Preferably, such force is not sufficient to stress the fiber in the manner described in connection with FIG. 2.

In the embodiment illustrated in FIGS. 11 and 12, the ridged grating 340 comprises a series of ridges 342 separated by a series of groves 344. The optical fiber 330 makes good acoustic contact with the top surface 302 of the substrate 300 where the ridges 342 are pressing against the optical fiber 330. The optical fiber 330 makes poor or no acoustic contact with the top surface 302 of the substrate 300 in the areas of the groves 344. This is illustrated more clearly in FIG. 13 which is a Partial cross-sectional view of the invention illustrated in FIG. 11. The acoustic wave 304 is represented pictorially as a solid undulating line in FIG. 13. One skilled in the art will understand that the acoustic wave 304 physically represents traveling undulations in the top surface 302 of the substrate 300 caused by the traveling acoustic wave 304.

As illustrated in FIG. 13, the ridges 342 of the preferred embodiment have a length in the direction of propagation of the optical signal in the fiber 330 shown as $\Lambda_g/2$. Similarly, the groves 344 have a distance in the direction of propagation of the optical signal in the optical fiber 330 of $\Lambda_g/2$. Thus, the distance between corresponding locations on the spaced-apart ridges 342 is shown as $\Lambda_g$. In other words, the distance from the beginning of one ridge 342 to the beginning of the next ridge 342 is $\Lambda_g$. As further illustrated in FIG. 13, the optical fiber 330 is acoustically stressed in the areas where the ridges 342 push the optical fiber 330 against the top surface 302 of the substrate 300. In the areas under the groves 344, the optical fiber 330 is not pushed against the top surface 302. Thus, the optical fiber 330 is not acoustically stressed in the areas under the groves 344. Thus, an optical signal traveling through the fiber 330 passes through alternate acoustically stressed locations and acoustically unstressed locations, corresponding to the ridges 342 and the groves 344, respectively. As will be set forth in detail below, the use of a periodic structure to cause the acoustic wave to contact the optical fiber 330 at spatially periodic locations provides a means for causing cumulative coupling between the two optical propagation modes.

Figure 14:
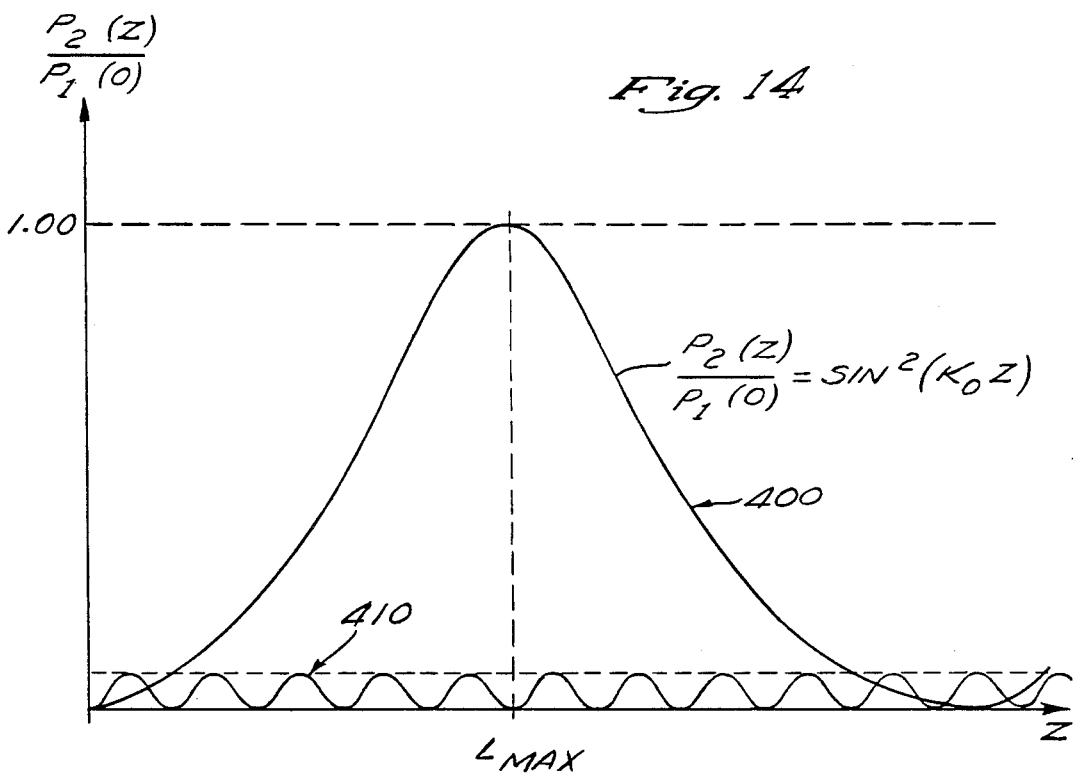
FIG. 14 is a graphical representation of the coupling of optical energy from a first propagation mode to a second propagation mode and back to the first propagation mode, illustrating the difference between a phase-matched acoustic wave and an acoustic wave which is not phase-matched.

In order to more fully understand the present invention, it is helpful to first review the coupling provided by above-described phase-matched device of FIGS. 2 and 3. FIG. 14 illustrates a graph of coupled optical power versus distance (z) along the fiber 10 (FIG. 2) in an interaction region defined by the length of the ridged pusher 20 (FIG. 2) or the distance along which the acoustic wave 30 (FIG. 3) stresses the fiber. As set forth above, the alternate stressed and unstressed regions caused by the ridged pusher of FIG. 2 or the acoustic wave of FIG. 3 cause cumulative coupling of light between the two polarization modes of the fiber 10 as the optical signal passes through the interaction region. If one first assumes that all of the optical energy is propagating in one of the two propagation modes prior to entering the interaction region of the fiber, that input optical energy can be represented as $P_1(0)$, indicating the power in the first polarization mode at zero-distance into the interaction region. As the optical signal travels through the portion of the optical fiber 10 which is stressed by the ridged pusher or the acoustic wave, optical power is gradually coupled to the second propagation mode. This power can be represented as $P_2(z)$ wherein the subscript "2" indicates the power in the second propagation mode and z represents the distance from the beginning of the acoustic interaction region. As the optical signal passes through the interaction region, the coupled power increases gradually and continuously until, for example, 100% of the power is coupled to the second propagation mode. It has been shown that for a properly phase matched acoustic wave, the coupled power is a sine-squared ($\sin^2$) function of the coupling coefficient $\kappa_0$ and the distance traveled in the stressed region of the fiber. This is represented graphically in FIG. 14, wherein the horizontal axis of the graph represents the distance from the beginning of the interaction region and is shown as z, and the vertical axis is the percent of power coupled to the second propagation mode normalized with respect to the power initially in the first polarization mode at the beginning of the stressed regions. The vertical axis is shown as $P_2(z)/P_1(0)$. Thus, a graph 400 in FIG. 14 is the graph of the equation:

$$\frac{P_2(z)}{P_1(0)} = \sin^2(\kappa_0 z) \tag{10}$$

In Equation (10), the coupling coefficient $\kappa_0$ is determined by the magnitude of the applied acoustic energy. As illustrated in FIG. 14, as the distance along the length of the fiber increases, the energy coupled to the second propagation mode gradually increases to 100% (i.e., $P_2(z)/P_1(0)=1.0$), and then begins to decrease along the same sine-squared curve. The location where 100% of the optical energy has been coupled to the second propagation mode is shown in FIG. 14 as $L_{max}$. For the ridged pusher structure of FIG. 2, the applied force and the number of ridges can be selected so that the length of the interaction region is equal to $L_{max}$, thereby causing all the optical energy input to one mode to be coupled to the other mode. Similarly, for the acoustic wave structures of FIGS. 3 and 7, the amount of acoustic energy applied to the optical fiber (e.g., the optical fiber 146 in FIG. 7), can be adjusted so that $L_{max}$ is equal to the length of the interaction region so that no further coupling occurs once 100% of the input signal has been coupled to the second propagation mode.

Since $\sin^2(\kappa_0 z)$ is at a maximum when $\kappa_0 z = \pi/2$, then the applied forces are adjusted so that $\kappa_0 = \pi(2NL_B)$. Thus, when the optical signals exit the interaction region, substantially 100% of the optical energy will have been coupled from the first propagation mode to the second propagation mode.

Continuing to refer to FIG. 14, a graph 410 represents a graph of the coupling for the devices of FIGS. 2, 3, and 7 when the acoustic wavelength is not properly matched with the beat length to the fiber, for example, when the acoustic frequency is increased to a frequency higher than the frequency corresponding to proper phase matching between the acoustic wavelength and the beat length of the fiber. When this occurs, only a small fraction of the power initially in one propagation mode is coupled to the other propagation mode, then it is coupled back to the other propagation mode in a relatively short distance. The periodic transfer of power between the propagation modes continues as the optical signal travels down the optical fiber. Thus, as illustrated by the graph 410 in FIG. 14, the maximum power transferred to the second propagation mode is substantially less than 100% of the input power in the first propagation mode. The periodicity of the graph 410 indicates that the amount of power coupled to the second propagation mode cannot be increased by increasing the length of the acoustic interaction region. Thus, it has heretofore been believed that the only way to obtain efficient coupling between the propagation modes using an acoustic wave or a simulated traveling wave to cause the coupling is to match the wavelength of the traveling acoustic wave or a simulated traveling wave with the beat length of the fiber, as described above, either by using a relatively low frequency acoustic wave or by angling the propagation path of the acoustic wave with respect to the direction of propagation of the optical signals in the optical fiber. However, Applicants' novel structure, illustrated in FIGS. 11–13, unexpectedly provides an alternative to the phase matching requirements of the above-described structures.

Figure 15:
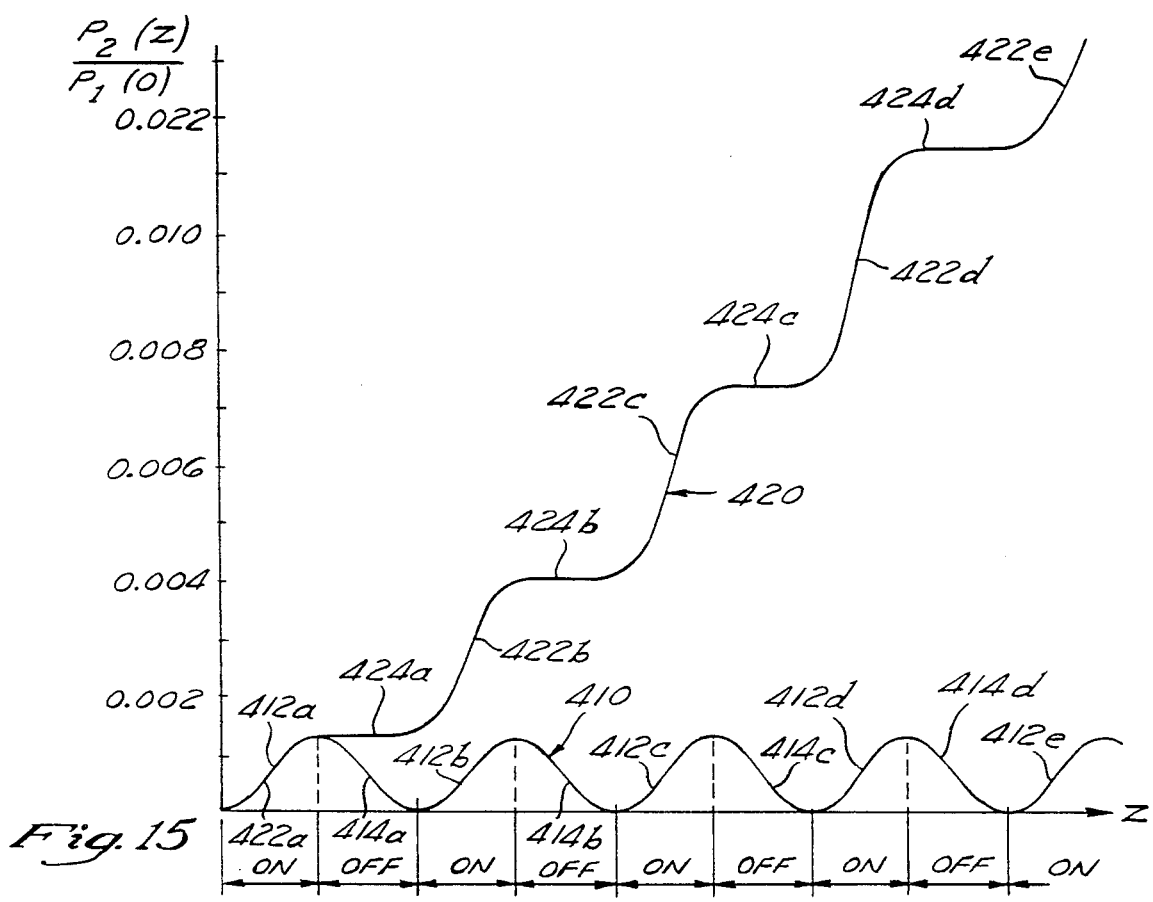
FIG. 15 is a graphical representation of the cumulative effect of selectively enabling coupling from the first propagation mode to the second propagation mode and disabling coupling from the second propagation mode back to the first propagation mode.

FIG. 15 graphically illustrates an explanation for the operation of the present invention. FIG. 15 is a graph on an enlarged scale of the periodic coupling graph 410 caused by the mismatched acoustic wave. The periodic coupling graph 410 comprises first coupling portions 412a, 412b, 412c, 412d, 412e, etc., which represent coupling from the first propagation mode to the second propagation mode and second coupling portions 414a, 414b, 414c, 414d, etc., which represent coupling from the second propagation mode back to the first propagation mode. The device of the present invention eliminates the second coupling portions 414a–d, etc., so that the coupling portions 412a–e are cumulative, thus causing a cumulative transfer of optical energy from the first propagation mode to the second propagation mode. This is graphically illustrated by a coupling graph 420 which comprises a series of cumulative coupling portions 422a, 422b, 422c, 422d, 422e, etc., representing the coupling of optical energy from the first propagation mode to the second propagation mode, alternating with a series of non-coupling portions 424a, 424b, 424c, 424d, etc., which represent no coupling in either direction. Since no energy is coupled back to the first propagation mode, energy coupled during each coupling portion 422a, 422b, etc. is cumulative. It should be noted that the percentage of the optical signal in the first propagation mode coupled to the second propagation mode by each coupling portion 422a, 422b, 422c, etc., is substantially smaller for a given distance than for the coupling which occurs when the acoustic wave length is matched with the beat length of the optical fiber. Furthermore, it should be noted that the cumulative coupling increases nonlinearly as a sine-squared function of distance. This is represented by the increasing coupling amounts for each of the coupling steps 422a, 422b, 422c, etc.

Figure 16:
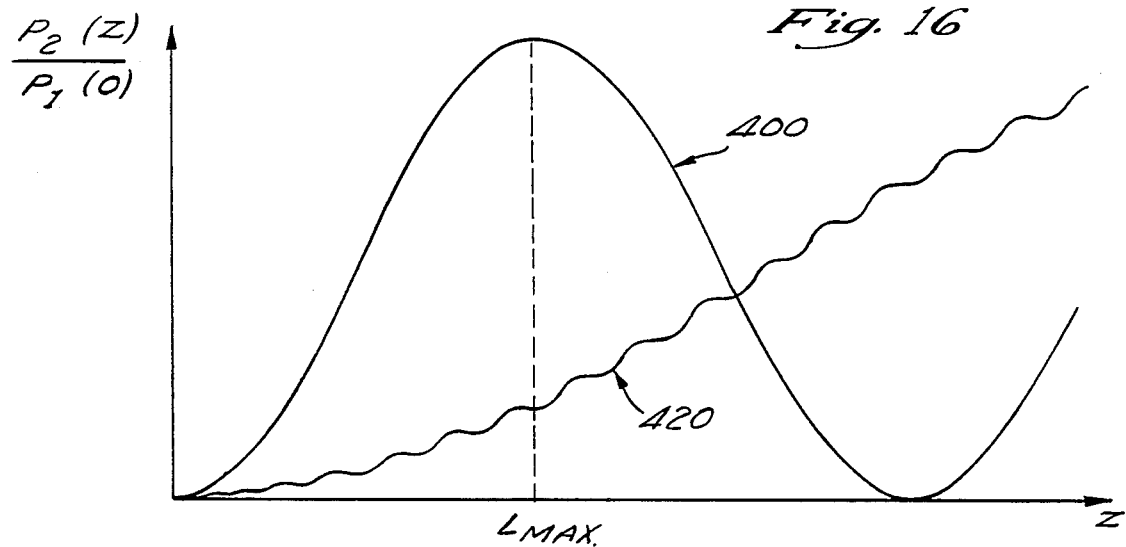
FIG. 16 is a graph of the optical energy coupled from the first propagation mode to the second propagation mode, having an expanded distance scale on the horizontal axis to show the relationship between the coupling in the present invention and the coupling caused by a phase-matched acoustic wave.
Figure 17:
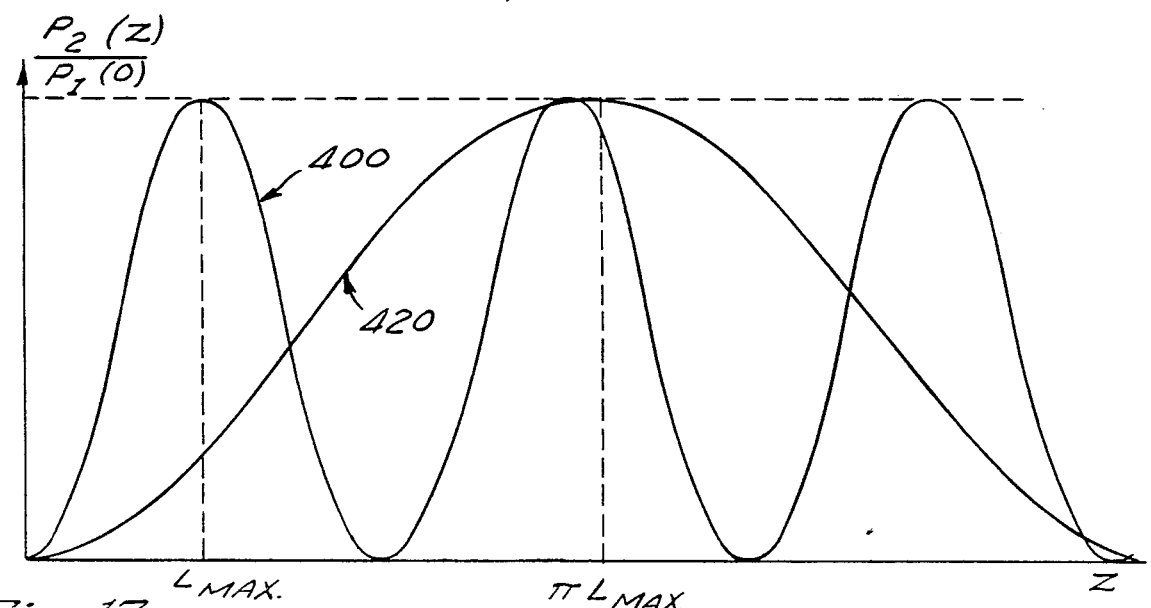
FIG. 17 is a graph of the coupling between the optical propagation modes, as in FIG. 16, with a further expanded horizontal scale to show the cumulative effect of the coupling caused by the periodic structure.

As further illustrated in FIG. 16, in which the graph 400 and the graph 420 are shown with an expanded distance scale on the horizontal axis, the graph 420 increases in a series of increasing steps corresponding to the incremental steps 422a, 422b, 422c, etc., in FIG. 15. Further expansion of the horizontal axis, as illustrated in FIG. 17, shows that the graph 420 has sine-squared function similar to the sine-squared function of the graph 400, except that for the same acoustic power applied to the optical fiber, the coupling represented by the graph 420 requires a length approximately $\pi$ times the length of the interaction region required to accomplish 100% coupling with a continuous coupler having the acoustic wave length matched with the optical beat length of the signal propagating in the optical fiber (i.e., $\pi L_{max}$).

Returning again to FIG. 13, the distance $\Lambda_g/2$ is selected to correspond to the length of the first coupling portions 412a, 412b, 412c, 412d, 412e, etc., of FIG. 15, so that the series of acoustically stressed regions under the ridges 342 of the periodic grating structure 340 cause the cumulative coupling effect represented by the graph 420 in FIG. 15. In other words, when an optical signal in the optical fiber 330 in the first propagation mode enters the the portion of the fiber under the first ridge 342a in FIG. 13, a portion of the power of the optical signal in the first propagation mode is coupled to the second propagation mode, as illustrated by the portion 422a of the graph 420 in FIG. 15. When the optical signal passes from the acoustically stressed area under the ridge 342a into the acoustically unstressed area under the grove 344a, the optical power coupled to the second propagation mode remains in the second propagation mode, as represented by the constant magnitude portion 424a of the graph 420 in FIG. 15. Similarly, when the optical signal next passes into the region of the optical fiber 330 acoustically stressed by the acoustic contact caused by the second ridge 342b, coupling occurs from the first propagation mode to the second propagation mode, as illustrated by the increasing portion 422b of the graph 420 in FIG. 15, and so on. Thus, the optical power coupled to the second propagation mode will gradually increase as was illustrated in FIGS. 16 and 17.

Figure 18:
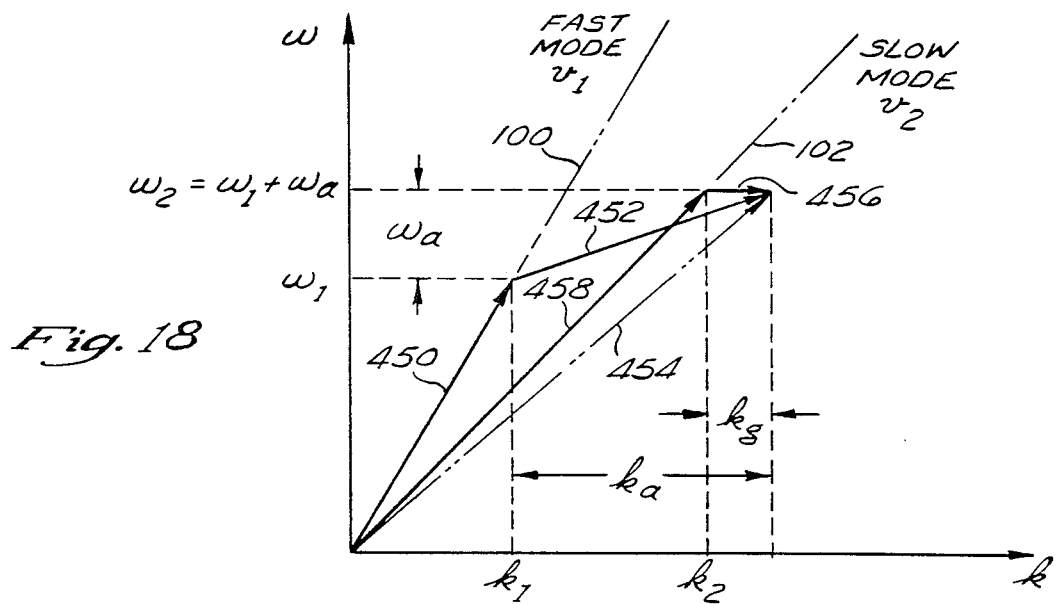
FIG. 18 is an $\omega$-k diagram illustrating the effect of the spatial propagation constant of the periodic structure to cause phase-matched coupling from the fast propagation mode to the slow propagation mode when the acoustic wave has a frequency too high for colinear phase-matching.

The distance $\Lambda_g$ referred to hereinafter as the periodicity of the periodic grating structure 340, is determined by the propagation constants of the two optical propagation modes and the propagation constant of the acoustic wave at the selected frequency shift. This can be more fully understood by referring to FIG. 18, which graphically illustrates the present invention in which the acoustic wave 304 is periodically coupled to the optical fiber 330 to provide the on/off optical coupling, described above. The graph 100 represents the fast optical propagation mode, and the graph 102 represents the slow optical propagation mode, as in FIGS. 4, 5, 6 and 10. A vector 450 represents the optical signal propagating in the fast propagation mode at a velocity $v_1$, a frequency $\omega_1$, and a propagation constant $k_1$. A vector 452 represents the acoustic wave 304 having a frequency $\omega_a$ and a propagation constant $k_a$ as indicated by the length $\omega_a$ along the $\omega$-axis of the graph and the length $k_a$ along the k-axis of the graph. A vector 454 (shown in phantom) represents the sum of the vector 450 and the vector 452. As set forth above, when the acoustic frequency is greater than the phase-matched acoustic frequency, the vector 454 does not have a slope that corresponds to the slope of the graph 102. Thus, the optical energy coupled to the slow propagation mode does not propagate in the slow propagation mode and is coupled back to the fast propagation mode, as was illustrated by the graph 410 in FIG. 14. In FIG. 18, a vector 456 is subtracted from the sum of the vector 450 and the vector 452. The vector 456 represents the spatial propagation constant of the periodic grating 340 in FIGS. 11-13. Since the periodic grating 340 is stationary, it has no time-varying component and is therefore shown as having no component along the $\omega$-axis (i.e., it is shown as having zero frequency and is thus shown as having a slope of zero representing no velocity). The vector 456 has a length along the k-axis corresponding to its effective propagation constant $k_g$. Since the periodic grating 340 is stationary, the propagation constant $k_g$ in radians/meter is determined according to the following equation:

$$k_g = 2\pi/\Lambda_g \quad (11)$$

where $\Lambda_g$ is the distance between corresponding portions of the ridges 342 of the periodic grating structure 340, as illustrated in FIG. 13. In other words, $\Lambda_g$ is the periodicity of the ridges 342 in meters/cycle. The periodicity $\Lambda_g$ of the grating structure is selected so that $$k_1 + k_a - k_g = k_2 \quad (12)$$

as shown in FIG. 18, and wherein a vector 458, representing the vector 450 plus the vector 452 minus the vector 456, has a slope corresponding to the slope of the graph 102 of the slow optical propagation mode. In other words, the velocity of an optical signal represented by the vector 458 is substantially equal to the velocity $v_2$ of the slow optical propagation mode. Thus, the difference between the acoustic propagation constant and the grating constant (i.e., $k_a - k_g$) is equal to the difference between the two optical propagation constants (i.e., $k_2 - k_1$).

Equation 12 above can be rewritten as follows:

$$k_g = k_a + k_1 - k_2 \quad (13)$$

It is known that $$k_a = 2\pi/\Lambda_a \quad (14)$$

where $\Lambda_a$ is the acoustic wavelength of the acoustic wave 304. It is also known that:

$$k_2 - k_1 = 2\pi/L_B \quad (15)$$

where $L_B$ is the beat length of the two optical signals at the frequencies $\omega_1$ and $\omega_2$, respectfully. Thus Equation (13) can be rewritten as:

$$\frac{2\pi}{\Lambda_g} = \frac{2\pi}{\Lambda_a} - \frac{2\pi}{L_B} \quad (16)$$

Equation (16) can be rewritten so that the periodicity $\Lambda_g$ of the periodic grating structure 340 can be expressed as follows:

$$\Lambda_g = \frac{1}{\frac{1}{\Lambda_a} - \frac{1}{L_B}} \quad (17)$$

As a specific example of an embodiment of the present invention, an optical fiber 330 having a beat length of approximately 1.7 mm at an optical wavelength of 633 nm was used. As set forth above, an acoustic signal propagating at a velocity of 3411 meters/second at a frequency of approximately 2.0 MHz has a wavelength of approximately 1.7 mm. Thus, if the acoustic wave propagates colinearly with the optical signal, a frequency greater than 2.0 MHz would not phase-match the acoustic wavelength to the fiber beat length. If it is desired to increase the wavelength to, for example, 5.6 MHz, the acoustic wavelength would become 0.61 mm which is substantially different from the 1.7 mm required for phase-matching. However, solving Equation (17) above, one finds that a periodic grating structure 340 having a periodicity $\Lambda_g$ of 0.94 mm causes cumulative coupling of the optical signal from the first propagation mode to the second propagation mode in accordance with FIGS. 14-18.

The present invention is particularly advantageous in that it enables colinear propagation of a high frequency acoustic wave with the optical signal, and thus, the acoustic wave can be guided to propagate along a narrow channel so that the acoustic power is confined to an elongate strip which forms a waveguide to maintain the acoustic power in close proximity to the optical fiber.

It can be shown that the fraction of power coupled from a first propagation mode to a second propagation mode can be expressed mathematically by the following expression:

$$\frac{P_2(L)}{P_1(0)} = \quad (18)$$

$$\frac{4\kappa_0^2/\pi^2}{4\kappa_0^2/\pi^2 + \Delta k^2} \sin^2\left(\frac{1}{2}\sqrt{(4\kappa_0^2/\pi^2) + \Delta k^2}\, L\right)$$

where L is the interaction length between the acoustic wave and the optical fiber, $\kappa_0$ is a coupling coefficient per unit length characteristic of the acoustic wave if it were in continuous contact with the optical fiber, and $\Delta k$ is defined by:

$$\Delta k = k_1 + k_a - k_2 - k_g \quad (19)$$

In the case where the acoustic frequency and the periodicity of the grating are properly selected so that $\Delta k$ equals 0, equation (18) above reduces to:

$$\frac{P_2(L)}{P_1(0)} = \sin^2 \frac{\kappa_0 L}{\pi} \quad (20)$$

Note that the Equation (20) above is similar to the Equation (10) for the continuous coupling devices described above except that for the same amount of coupling, a length of $\pi$ times as long an interaction region is required.

In an experimental embodiment of the present invention, using the above-described dimensions and using a ridged grating structure having 28 ridges, an optical coupling efficiency of 26% was obtained using an acoustic power of 32 watts. In the experimental embodiment, the fused quartz substrate had cross-sectional dimensions of one inch by one inch. In preferred embodiments of this invention, the cross-sectional dimensions of the quartz substrate will be substantially smaller so that the input acoustic energy is more tightly confined to propagate along the interface between the substrate and the optical fiber. Thus, since the acoustic wave propagates colinearly with the optical fiber, the width of the substrate acting as the acoustic propagation means does not have to be significantly wider than the optical fiber. It is therefore expected that the acoustic power required in the experimental embodiment can be significantly reduced by utilizing a substrate having an acoustic propagation surface which is no wider than is necessary for propagation of the acoustic wave.

Although described above in connection with a ridged pusher, the present invention can be constructed by using other means of providing periodic acoustic contact. For example, as illustrated in FIG. 19, portions of the cladding of an optical fiber 500 can be periodically removed to form a series of grooves 502 so that the cladding of the fiber only contacts the upper surface 510 of an acoustic substrate 512 at the larger diameter unremoved portions 504 of the fiber. A flat plate (not shown) can be used to hold the larger diameter optical fiber portions 504 against a flat upper surface 510 of the substrate 512 to provide sufficient acoustic contact. Alternatively, the optical fiber 500 may be bonded to the upper surface 510 of the substrate 512 so that the portions 504 of the optical fiber 500 are in good acoustic contact with the substrate 512, thereby eliminating the need for the flat plate. An acoustic wave is caused to propagate along the upper surface 510 of the substrate 512 by a transducer 514 mounted at one end 516 of the substrate as described above in connection with FIGS. 11-13.

In a further alternative embodiment illustrated in FIG. 20, a substrate 520 has a notched upper surface 522 to provide the periodic grating structure. The upper surface comprises a series of notches 524 which form a series of raised ridges 526 therebetween. Preferably, the notches 524 are sufficiently deep so as to avoid contact with the fiber 500, yet not so deep so as to significantly perturb the propagation of an acoustic wave generated by the transducer 514. A flat pusher plate (not shown) can be used to force the optical fiber (500) into sufficient acoustic contact with the upper surface 522 of the substrate 520, or the optical fiber can be bonded to ridges 526 formed by the notches.

Although described above in terms of the acoustic wave propagating precisely colinearly with the optical signals in the optical fiber, the acoustic wave can be propagated at an angle with respect to the optical fiber to provide additional tuning. Furthermore, the ridges and grooves of the periodic grating structure (e.g., the grating structure 340 in FIGS. 11-13) can also be positioned at an angle with respect to the fiber. This is illustrated schematically in FIG. 21, wherein a series of acoustic wavefronts 600 are shown striking an optical fiber 602 at an angle $\theta$ with respect to the fiber axis, and a periodic grating structure 604 is shown positioned at an angle $\phi$ with respect to the fiber axis. Equation (13) above can be rewritten in terms of the angles $\theta$ and $\phi$ as follows:

$$k_2 - k_1 - k_a \cos\theta + k_g \cos\phi = 0 \quad (21)$$

When $\theta$ and $\phi$ are both equal to zero, we have:

$$k_2 - k_1 - k_a + k_g = 0$$

as above. Since positioning the periodic structure at an angle $\phi$ with respect to the optical fiber 602 effectively increases the periodicity $\Lambda_g$, the operational frequency would thus be lowered. Thus, angling the periodic structure 604 with respect to the optical fiber 602 can be used as a means of fine tuning for a particular acoustic frequency. Angling the acoustic waves 600 with respect to the optical fiber 602 has the effect of increasing the operational frequency as described above in connection with FIG. 7. Thus, with a fixed periodicity for the grating structure 604, the direction of propagation of the acoustic waves 600 can be angled to increase the operational frequency above the frequency required for colinear propagation.

What is claimed is:

1. An apparatus for shifting the optical frequency of an optical signal from a first optical frequency to a second optical frequency, comprising:

an optical fiber having first and second propagation paths for propagation of said optical signal therein, said first propagation path having a first optical propagation constant $k_1$ at said first optical frequency, said second propagation path having a second optical propagation constant $k_2$ at said second optical frequency;

means for generating an acoustic wave having an acoustic frequency equal to the difference between said first optical frequency and said second optical frequency;

acoustic propagation means for propagating said acoustic wave in proximity to said optical fiber, said acoustic propagation means having an acoustic propagation constant $k_a$; and means for positioning said optical fiber in acoustic contact with said acoustic propagation means at periodic locations along said fiber so that said acoustic wave stresses said optical fiber at said periodic locations to cause optical energy to be coupled from said first optical propagation path to said second optical propagation path and to be shifted in frequency by an amount equal to the acoustic frequency, said periodic locations spaced apart from each other by a distance $\Lambda_g$ and having an effective propagation constant $k_g$ equal to $2\pi/\Lambda_g$, said effective propagation constant $k_g$ having a value such that the difference between said acoustic propagation constant $k_a$ and said effective propagation constant $k_g$ is substantially equal to the difference between said first optical propagation constant $k_1$ an said second optical propagation constant $k_2$.

2. The apparatus as defined by claim 1, wherein said means for positioning said optical fiber in acoustic contact with said acoustic propagation means comprises a series of spatially periodic ridges and grooves formed in said acoustic propagation means, said optical fiber contacting said acoustic propagation means only at said ridges so that said acoustic wave stresses said optical fiber only at said ridges.

3. The apparatus as defined by claim 1, wherein said optical fiber has a core and a cladding, and wherein said means for positioning said optical fiber in acoustic contact with said acoustic propagation means comprises a series of spatially periodic grooves formed in the cladding of said optical fiber to form a series of spatially periodic ridges on said cladding between said grooves so that the cladding of said optical fiber contacts said acoustic propagation means only at said ridges.

4. An apparatus for shifting the frequency of an optical signal between a first optical frequency and a second optical frequency, comprising:
an optical fiber having a longitudinal axis, and first and second optical propagation paths;
means for generating acoustic energy; and
means for applying said acoustic energy to propagate along said fiber, said applying means in acoustic contact with said fiber to cause at least a portion of the applied acoustic energy to be transferred to said fiber to stress said fiber, said applying means including means for concentrating the transferred acoustic energy at plural locations, spaced along said fiber, so that said acoustic energy stresses said fiber preferentially at each of said plural locations, said propagation of said acoustic energy causing light at said first frequency to be coupled at each of said plural locations from said first optical path to said second optical path and shifted to said second frequency, said applying means comprising a substrate having a surface for propagating said acoustic energy, said surface formed to provide an elongated narrow waveguide which interfaces with said fiber at said plural locations to provide acoustic contact therebetween, the width of said waveguide being not substantially larger than that of the optical fiber to tightly confine the acoustic energy to the interface between the waveguide and the fiber.

5. An apparatus for shifting the frequency of an optical signal between a first optical frequency and a second optical frequency, comprising:
an optical fiber having a longitudinal axis, and first and second optical propagation paths, said first optical propagation path having a first optical propagation constant $k_1$, said second optical propagation path having a second optical propagation constant $k_2$;
means for generating acoustic energy, said acoustic energy having an acoustic propagation constant $k_a$; and
means for applying said acoustic energy to propagate along said fiber said applying means in acoustic contact with said fiber to cause at least a portion of the applied acoustic energy to be transferred to said fiber to stress said fiber, said applying means including means for concentrating the transferred acoustic energy at plural locations, spaced along said fiber, so that said acoustic energy stresses said fiber preferentially at each of said plural locations, said propagation of said acoustic energy causing light at said first frequency to be coupled at each of said plural locations from said first optical path to said second optical path and shifted to said second frequency, said plural locations being spaced apart from each other by a distance $\Lambda_g$ selected so that said plural locations have an effective static propagation constant $k_g$ defined by;

$$k_g = 2\pi/\Lambda_g$$

and wherein the difference between said first and second propagation constants, $k_1$ and $k_2$, is substantially equal to the difference between said acoustic propagation constant $k_a$ and said effective static propagation constant $k_g$.

6. An apparatus for shifting the frequency of an optical signal between first optical frequency and a second optical frequency, comprising:
a optical fiber having a longitudinal axis, and first and second optical propagation paths;
means for generating acoustic energy; and
means for applying said acoustic energy to propagate along said fiber, said applying means in acoustic contact with said fiber to cause at least a portion of the applied acoustic energy to be transferred to said fiber to stress said fiber, said applying means including means for concentrating the transferred acoustic energy at plural locations, spaced along said fiber so that said acoustic energy stresses said fiber preferentially at each of said plural locations, said propogation of said acoustic energy causing light at said first frequency to be coupled at each of said plural locations from said first optical path to said second optical path and shifted to said second frequency, the distance between corresponding portions of said plural locations being defined as a spatial period $\Lambda_g$, wherein said acoustic energy has a wavelength of $\Lambda_a$ along said fiber, and wherein said optical signal traveling in said fiber has a beat length $L_B$, said distance selected so that said spatial period $\Lambda_g$ is defined by the following relationship:

$$\Lambda_g = \frac{1}{\frac{1}{\Lambda_a} - \frac{1}{L_B}}$$

7. An apparatus for shifting the frequency of an optical signal between a first optical frequency and a second optical frequency, comprising:
an optical fiber having a longitudinal axis, and first and second optical propagation paths;
a device for generating acoustic energy, having a wavelength less than the beat length of an optical signal propagating along the two propagation paths of the optical fiber; and
means for applying said acoustic energy to propagate along said fiber, said applying means in acoustic contact with said fiber to cause at least a portion of the applied acoustic energy to be transferred to said fiber to stress said fiber, said applying means including means for concentrating the transferred acoustic energy at plural locations, spaced along said fiber, so that said acoustic energy stresses said fiber preferentially at each of said plural locations, said propagation of said acoustic energy causing light at said first frequency to be coupled at each of said plural locations from said first optical path to said second optical path and shifted to said second frequency.

8. The apparatus as defined in claim 7, wherein said plural locations are spaced apart by a distance so related to the propagation constant of the acoustic wave along the fiber to cause said coupling and shifting in frequency.

9. The apparatus as defined in claim 7, wherein substantially no coupling of said light occurs in said fiber between said plural locations.

10. The apparatus as defined in claim 7, wherein said optical signal is input to said optical fiber in said first propagation path, and wherein the number of said plural locations and the intensity of said acoustic energy are selected to cause substantially all of the light in said first path to be coupled from said first path to said second path.

11. The apparatus as defined by claim 7, wherein said applying means comprises a substrate having a surface for propagating said acoustic energy as a surface acoustic wave, and a periodic structure for holding said fiber in acoustic contact with said surface at said spaced plural locations to concentrate said acoustic energy at said spaced plural locations.

12. The apparatus of claim 7, wherein said acoustic energy propagates as a surface acoustic wave having wavefronts which are perpendicular to said longitudinal axis of said optical fiber.

13. The apparatus of claim 7, wherein said applying means comprises a substrate having a surface for propagating said acoustic energy, said surface and said fiber relatively positioned to cause said acoustic energy to preferentially contact said fiber at said plural locations.

14. The apparatus of claim 13, wherein said fiber has a core and a cladding, and wherein said fiber has a portion of the cladding removed between each of said plural locations to inhibit acoustic contact of said fiber with said surface between each of said plural locations.

15. The apparatus of claim 13, wherein the surface of said substrate has a periodically varying elevation to inhibit acoustic contact of said fiber with said surface between each of said plural locations.

16. The apparatus of claim 7, wherein said applying means comprises a periodic structure for biasing said fiber into enhanced acoustic contact with said acoustic energy only at said plural locations.

17. The apparatus of claim 4, wherein said optical fiber has only said first and second propagation paths.

18. The apparatus of claim 17 wherein said propagation paths comprise the polarization modes of a single-mode birefringent fiber.

19. An apparatus for shifting the optical frequency of an optical signal from a first optical frequency to a second optical frequency, comprising:
an optical waveguide having first and second propagation paths for propagation of optical energy therein, said first propagation path having a first optical propagation constant $k_1$ at said first optical frequency, said second propagation path having a second optical propagation constant $k_2$ at said second optical frequency;
an acoustic generator coupled to apply acoustic energy to said waveguide such that an acoustic wave propagates in accordance with an acoustic propagation constant $k_a$, said acoustic energy interacting with said optical energy at plural locations along said waveguide such that optical energy is coupled from said first optical propagation path to said second optical propagation path substantially exclusively at said locations, said locations being spaced apart from each other by a distance $\Lambda g$ and having an effective propagation constant $k_g$ equal to $2\pi/\Lambda_g$, said effective propagation constant $k_g$ having a value such that the difference between said acoustic propagation constant $k_a$ and said effective propagation constant $k_g$ is substantially equal to the difference between said first optical propagation constant $k_1$ and said second optical propagation constant $k_2$.

20. A method of manufacturing a frequency shifter comprising an optical fiber having two propagation modes, and a substrate having a surface for propagating acoustic energy, said method comprising:
mounting said fiber on said surface such that at least a component of said acoustic energy propagates along the length of said fiber;
holding said fiber in acoustic contact with said surface such that said acoustic energy is preferentially applied to acoustically contact said fiber at spaced locations along said fiber, and is preferentially inhibited from acoustically contacting said fiber between said locations; and
mounting an acoustic transducer to provide said acoustic energy at an acoustic wavelength which is significantly less than the beat length of said fiber for said modes.

21. Method of frequency shifting utilizing an optical fiber having two propagation modes, comprising:
applying acoustic energy having a wavelength to propagate along said fiber;
selecting the wavelength of said acoustic energy so that said wavelength is significantly less than the beat length of said fiber for said propagation modes;
transferrring at least a portion of said acoustic energy to said optical fiber to stress said fiber; and
concentrating the transferred acoustic energy at plural locations along said fiber so that the acoustic energy stresses the fiber preferentially at each of said locations, said stresses causing coupling of frequency shifted light from one of said modes to the other.

22. A fiber optic frequency shifter, comprising:
an optical fiber having a longitudinal axis, two propagation modes, and a beat length for said two modes;
means for generating an acoustic wave having acoustic wavefronts directed to propagate along said fiber; and means for transferring acoustic energy from said wavefronts to said optical fiber, said transferring means including means for enhancing said transfer of said acoustic energy at spaced locations, said locations being spaced in relation to (i) the beat length of the fiber and (ii) the distance between said wavefronts, measured in a direction along said fiber, to cause coupling of frequency shifted light from one of the modes to the other, the distance between the wavefronts being significantly less than the beat length of said fiber.

23. A fiber optic frequency shifter, as defined by claim 22, wherein said wavefronts are perpendicular to said longitudinal axis of said optical fiber so that said distance between said wavefronts is equal to the wavelength of said acoustic wave.

24. A fiber optic frequency, as defined by claim 22, wherein said fiber has exclusively two modes.

25. A fiber optic frequency shifter, comprising:
optical fiber means forming two propagating paths;
means for generating an acoustic wave having acoustic energy;
means forming an elongate waveguide, for propagating said acoustic energy, said propagating means mounting said optical fiber means longitudinally along said elongate waveguide, said waveguide sufficiently narrow to tightly confine said acoustic energy into close proximity to said optical fiber means;

means for exposing spaced segments of said optical fiber means to said acoustic energy and for inhibiting said exposure between segments.

26. A fiber optic frequency shifter, comprising:
an optical fiber for guiding an optical signal, said fiber having two propagation modes and a beat length for said two modes; and
means for propagating an acoustic wave along said fiber in a direction substantially colinear with said optical signal, the wavelength of said acoustic wave substantially shorter than the beat length of said fiber, such that the acoustic wave propagation constant is significantly greater than the difference between the propagation constants of said modes, said propagating means including means for causing said acoustic wave to acoustically contact said fiber with a spatial periodicity which yields a spatial propagation constant that combines with the propagation constant of said acoustic wave to substantially match the difference between the propagation constants of said modes.

27. A fiber optic frequency shifter, comprising:
an optical fiber having first and second propagation modes, said fiber comprising plural coupling segments, each said coupling segment spaced from another coupling segment by a non-coupling segment;
an acoustic generator for generating acoustic energy having an acoustic wavelength which is significantly less than the beat length of said fiber for said modes, said acoustic generator oriented such that at least a component of said acoustic energy propagates down said fiber, said acoustic energy being applied to said coupling segments, such that said coupling of light between said modes is enhanced in said coupling segments and is inhibited in said non-coupling segments.

28. A method of frequency shifting, comprising:
generating acoustic energy:
applying said acoustic energy to an optical fiber having first and second propagation modes such that at least a component of the acoustic energy propagates down the fiber;
utilizing said acoustic energy to couple light between said modes over an interaction length;
selecting an acoustic wavelength for said acoustic energy which is less than the beat length for said two modes to provide a power transfer characteristic for said interaction length which varies periodically such that said interaction length comprises forward coupling regions in which light is transferred from said first mode to said second mode and back coupling regions in which light is transferred from said second mode to said first mode; and
inhibiting coupling in said back coupling regions to cause said coupling in said forward coupling regions to cumulatively couple light from said first mode to said second mode.

29. A fiber optic frequency shifter, comprising:
an optical fiber having first and second propagation modes;
an acoustic device comprising a transducer for generating acoustic energy having an acoustic wavelength which is less than the beat length for said two modes, said device adapted to apply said acoustic energy to said fiber preferentially at spaced locations along said fiber to cause preferential coupling of light between said modes at said locations, said coupled light being shifted in frequency in accordance with the wavelength of said acoustic energy, said acoustic wavelength providing a power transfer characteristic for said coupling which varies periodically such that said coupling is substantially exclusively from said first mode to said second mode at said locations.

30. A fiber optic frequency shifter, as defined by claim 29, wherein said acoustic device comprises a member having a surface in contact with said fiber.

31. A fiber optic frequency shifter, as defined by claim 29, wherein said acoustic device comprises a member having a periodically varying surface.

32. A fiber optic frequency shifter, comprising:
an optical fiber having first and second propagation modes; and
an acoustic device comprising a transducer for generating acoustic energy having a wavelength which is less than the beat length of the fiber for said two modes, said device including a surface in contact with said fiber for applying said acoustic energy to said fiber preferentially at spaced locations along said fiber such that at least a component of said acoustic energy propagates down said fiber to cause preferential coupling of light between said modes at said locations, said coupled light being shifted in frequency in accordance with the wavelength of said acoustic energy, said locations being spaced such that said preferential coupling at said locations is substantially exclusively from said first mode to said second mode to cause said coupling to be cumulative.

* * * * *